United States Patent
Kodama et al.

(10) Patent No.: US 9,243,673 B2
(45) Date of Patent: Jan. 26, 2016

(54) DRIVING FORCE TRANSMISSION CONTROL APPARATUS

(71) Applicant: JTEKT Corporation, Osaka-shi (JP)

(72) Inventors: Akira Kodama, Chiryu (JP); Kenta Taniguchi, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 152 days.

(21) Appl. No.: 14/093,181

(22) Filed: Nov. 29, 2013

(65) Prior Publication Data

US 2014/0163831 A1    Jun. 12, 2014

(30) Foreign Application Priority Data

Dec. 6, 2012 (JP) ................................. 2012-267370

(51) Int. Cl.

| | | |
|---|---|---|
| F16D 13/54 | (2006.01) | |
| B60K 17/344 | (2006.01) | |
| F16D 28/00 | (2006.01) | |
| F16D 23/12 | (2006.01) | |
| B60K 23/08 | (2006.01) | |
| F16D 48/06 | (2006.01) | |
| F16D 121/04 | (2012.01) | |
| F16D 121/24 | (2012.01) | |

(52) U.S. Cl.
CPC .............. *F16D 13/54* (2013.01); *B60K 17/344* (2013.01); *B60K 23/0808* (2013.01); *F16D 23/12* (2013.01); *F16D 28/00* (2013.01); *B60K 2023/0833* (2013.01); *B60K 2023/0858* (2013.01); *B60W 2510/0208* (2013.01); *B60W 2510/0241* (2013.01); *B60W 2710/027* (2013.01); *F16D 48/06* (2013.01); *F16D 2023/123* (2013.01); *F16D 2121/04* (2013.01); *F16D 2121/24* (2013.01)

(58) Field of Classification Search
None
See application file for complete search history.

(56) References Cited

U.S. PATENT DOCUMENTS

| | | | | |
|---|---|---|---|---|
| 5,740,877 | A * | 4/1998 | Sasaki ........................... | 180/248 |
| 5,839,084 | A * | 11/1998 | Takasaki et al. ................. | 701/67 |
| 5,947,224 | A * | 9/1999 | Kouno .......................... | 180/248 |
| 6,330,928 | B1 * | 12/2001 | Sekiya et al. .................. | 180/242 |
| 6,408,247 | B1 * | 6/2002 | Ichikawa et al. .............. | 701/301 |
| 2003/0036837 | A1 * | 2/2003 | Katayama et al. .............. | 701/69 |
| 2004/0116247 | A1 * | 6/2004 | Wakamatsu .................... | 477/86 |

(Continued)

FOREIGN PATENT DOCUMENTS

| | | |
|---|---|---|
| JP | 2009-108972 | 5/2009 |
| JP | 2012-61923 | 3/2012 |

*Primary Examiner* — Mussa A Shaawat
(74) *Attorney, Agent, or Firm* — Oblon, McClelland, Maier & Neustadt, L.L.P.

(57) ABSTRACT

A driving force transmission control apparatus includes a multiple disc clutch including a plurality of outer clutch plates, and a plurality of inner clutch plates; a pressing mechanism that presses the multiple disc clutch; and a control portion that controls the pressing mechanism. The outer clutch plates and inner clutch plates are engaged with an intermediate shaft and an inner shaft respectively. The control portion makes a determination as to whether the multiple disc clutch is in a first operating condition in which the multiple disc clutch is pressed with a relative rotation speed between the intermediate and the inner shafts being equal to or higher than a predetermined value, or in a second operating condition in which the multiple disc clutch is pressed with the relative rotation speed being lower than the predetermined value, and the control portion controls the pressing mechanism based on a result of the determination.

18 Claims, 14 Drawing Sheets

(56) References Cited

U.S. PATENT DOCUMENTS

| | | | |
|---|---|---|---|
| 2005/0217916 A1* | 10/2005 | Mori et al. | 180/233 |
| 2006/0231310 A1* | 10/2006 | Suzuki et al. | 180/197 |
| 2007/0209462 A1* | 9/2007 | Suzuki et al. | 74/335 |
| 2008/0234101 A1* | 9/2008 | Suzuki | 477/97 |
| 2009/0211830 A1* | 8/2009 | Kato et al. | 180/244 |
| 2009/0229905 A1* | 9/2009 | Kato et al. | 180/249 |
| 2010/0274456 A1* | 10/2010 | Kondo et al. | 701/69 |
| 2012/0062375 A1* | 3/2012 | Takeuchi et al. | 340/441 |
| 2013/0226418 A1* | 8/2013 | Yang | 701/59 |
| 2013/0226421 A1 | 8/2013 | Horaguchi et al. | |
| 2013/0275014 A1* | 10/2013 | Yang | 701/52 |
| 2013/0304341 A1* | 11/2013 | Sakaguchi et al. | 701/69 |
| 2014/0135168 A1* | 5/2014 | Yokoo | 477/8 |
| 2014/0297146 A1* | 10/2014 | Murakami et al. | 701/69 |

* cited by examiner (FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(SECOND EMBODIMENT)

(SECOND EMBODIMENT)

(THIRD EMBODIMENT)

DRIVING FORCE TRANSMISSION CONTROL APPARATUS

INCORPORATION BY REFERENCE

The disclosure of Japanese Patent Application No. 2012-267370 filed on Dec. 6, 2012 including the specification, drawings and abstract is incorporated herein by reference in its entirety.

BACKGROUND OF THE INVENTION

1. Field of the Invention

The invention relates to a driving force transmission control apparatus that transmits a driving force in, for example, a vehicle.

2. Description of Related Art

There has been provided a driving force transmission system in a four wheel drive vehicle, in which a dog clutch is arranged between a propeller shaft and a drive source (engine), and a driving force transmission device capable of continuously adjusting a transmitted driving force is arranged between the propeller shaft and auxiliary drive wheels (rear wheels). Refer to, for example, Japanese Patent Application Publication No. 2012-61923 (JP 2012-61923 A).

In the four wheel drive vehicle described in JP 2012-61923 A, if it is determined that the frictional coefficient of a road surface is lower than a predetermined value, the dog clutch is engaged before the four wheel drive vehicle is started, in view of the problem that if slipping occurs at main drive wheels (front wheels) at the time of starting the four wheel drive vehicle, differential rotation between an input member and an output member for the dog clutch increases, and accordingly the dog clutch cannot be engaged. Thus, even if slipping occurs at the main drive wheels at the time of starting the four wheel drive vehicle, the driving force of a drive source can be promptly distributed to the auxiliary drive wheels so as to suppress the slipping.

Further, the driving force transmission device described in JP 2012-61923 A is arranged between an outer housing on the propeller shaft-side and an inner shaft on the auxiliary drive wheels-side. This driving force transmission device includes a multiple disc clutch and a pressing mechanism. The multiple disc clutch includes a plurality of outer clutch plates and a plurality of inner clutch plates, the outer clutch plates and the inner clutch plates being alternately arranged. The pressing mechanism presses the multiple disc clutch so that the outer clutch plates and the inner clutch plates frictionally slide. The pressing mechanism includes a cam mechanism and an electromagnetic coil. In the cam mechanism, a pressing force is generated by relative rotation between a first cam member and a second cam member. The pressing mechanism is configured such that when the outer housing and the inner shaft are rotated relative to each other while the electromagnetic coil is energized, the first cam member and the second cam member are rotated relative to each other to operate the cam mechanism, thereby pressing the multiple disc clutch.

However, in this driving force transmission device, the cam mechanism is operated due to relative rotation between the outer housing and the inner shall, and accordingly, the multiple disc clutch cannot be pressed before the four wheel drive vehicle is started. Thus, even if the electromagnetic coil is in the energized state and the dog clutch is in the engaged state, the four wheel drive vehicle is brought to a two wheel drive mode in which the driving force is transmitted only to the main drive wheels from the driving force source, at the moment at which the four wheel drive vehicle is started.

Thus, it is conceivable to use a pressing mechanism having a configuration in which a cam mechanism is operated by a torque of an electric motor, as in a driving force transmission device described in Japanese Patent application Publication No. 2009-108972. With the use of this pressing mechanism, a multiple disc clutch can be pressed even before a vehicle is started, and accordingly, the vehicle is brought to a four wheel drive mode at the moment at which the vehicle is started. Thus, it is possible to suppress slippage more reliably.

However, the inventors of the present application confirmed that the driving force actually transmitted through the multiple disc clutch varies even when an equal pressing force is generated by the pressing mechanism, in the case of using a pressing mechanism capable of pressing the multiple disc clutch even when there is not differential rotation between the input and output members for the multiple disc clutch. Thus, the inventors earnestly studied the reasons why the above-described phenomenon is caused, and found that there is a correlation between a differential rotation speed between the input and output members for the multiple disc clutch, and the driving force actually transmitted, when the multiple disc clutch is pressed.

SUMMARY OF THE INVENTION

An object of the present invention is to provide a driving force transmission control apparatus in which the accuracy of a driving force transmitted through a multiple disc clutch can be enhanced.

According to an aspect of the present invention, there is provided a driving force transmission control apparatus including: an outer rotary member having an inner peripheral surface in which a plurality of inner peripheral spline teeth is formed, the inner peripheral spline teeth extending in a direction of a rotation axis; an inner rotary member supported inside the outer rotary member so as to be coaxially rotatable relative to the outer rotary member, and having an outer peripheral surface in which a plurality of outer peripheral spline teeth is formed, the outer peripheral spline teeth extending in the direction of the rotation axis; a multiple disc clutch including a plurality of outer clutch plates engaged with the inner peripheral spline teeth so as to be axially movable, and a plurality of inner clutch plates engaged with the outer peripheral spline teeth so as to be axially movable, the outer clutch plates and the inner clutch plates being alternately arranged in the direction of the rotation axis; a pressing mechanism that presses the multiple disc clutch in the direction of the rotation axis; and a control portion that controls the pressing mechanism, wherein the control portion makes a determination as to whether the multiple disc clutch is in a first operating condition in which the multiple disc clutch is pressed with a relative rotation speed between the outer rotary member and the inner rotary member being equal to or higher than a predetermined value, or in a second operating condition in which the multiple disc clutch is pressed with the relative rotation speed being lower than the predetermined value, and the control portion controls the pressing mechanism based on a result of the determination.

BRIEF DESCRIPTION OF THE DRAWINGS

The foregoing and further features and advantageous of the invention will become apparent from the following description of example embodiments with reference to the accompanying drawings, wherein like numerals are used to represent like elements and wherein.

DETAILED DESCRIPTION OF EMBODIMENTS

Figure 1:
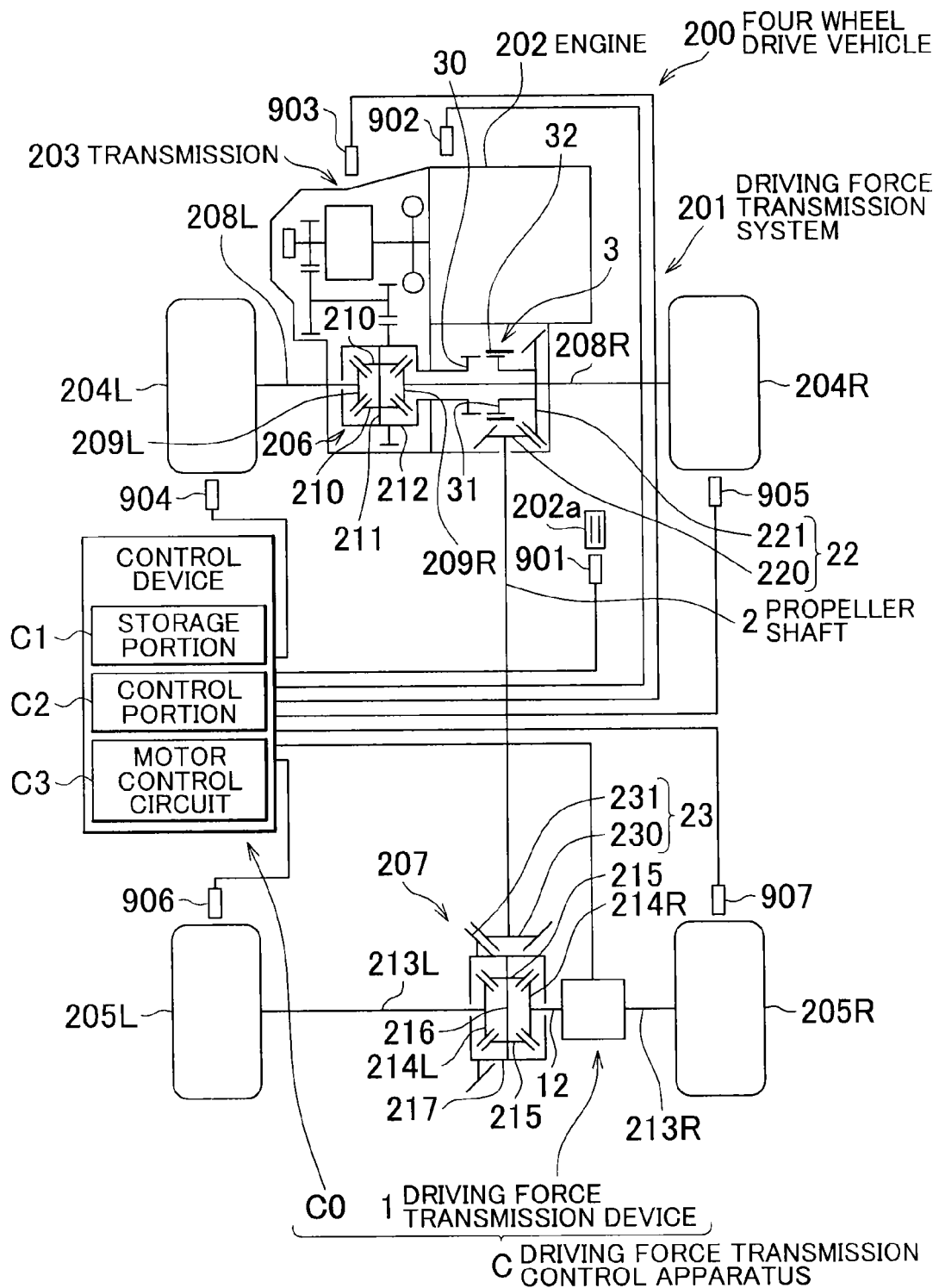
FIG. 1 is a configuration diagram showing a schematic configuration of a four wheel drive vehicle according to a first embodiment.

FIG. 1 is a configuration diagram showing a schematic configuration of a four wheel drive vehicle according to a first embodiment of the present invention. The four wheel drive vehicle 200 includes a driving force transmission system 201, an engine 202 serving as a drive source, a transmission 203, front wheels 204R, 204L as main drive wheels, and rear wheels 205R, 205L as auxiliary drive wheels. The engine 202 is an example of the drive source for driving the four wheel drive vehicle 200, that is, the drive source for starting and accelerating the four wheel drive vehicle 200. However, both of an engine and an electric motor may be used as the drive source. Further, instead of the engine, an electric motor may be used as the drive source for driving the vehicle.

The driving force transmission system 201 is arranged on a driving force transmission path from the transmission 203-side to the rear wheels 205R, 205L-side in the four wheel drive vehicle 200 together with a front differential 206 and a rear differential 207, and is also mounted on a vehicle body (not shown) of the four wheel drive vehicle 200.

Further, the driving force transmission system 201 includes a driving force transmission device 1, a propeller shaft 2 and a driving force interrupting device 3, and is configured to change the drive mode of the four wheel drive vehicle 200 from a four wheel drive mode to a two wheel drive mode, and from the two wheel drive mode to the four wheel drive mode. In the four wheel drive mode, the driving force of the engine 202 is transmitted to both the front wheels 204R, 204L and the rear wheels 205R, 205L, and in the two wheel drive mode, the driving force of the engine 202 is transmitted only to the front wheels 204R, 204L. The driving force transmission device 1 will be described in detail later.

Further, a control device C0 that controls the driving force transmission device 1 is mounted on the four wheel drive vehicle 200. The driving force transmission device 1 and the control device C0 constitute a driving force transmission control apparatus C that controls the transmission of the driving force from the engine 202 to the rear wheels 205R, 205L.

The front differential 206 includes side gears 209R, 209L, a pair of pinion gears 210, a pinion gear shaft 211 and a front differential casing 212. The side gears 209R, 209L are coupled respectively to axle shafts 208R, 208L on the front wheel side. The pinion gears 210 are respectively meshed with the side gears 209R, 209L with the gear axis of the pinion gears 210 being orthogonal to the gear axis of the side gears 209R, 209L. The pinion gear shaft 211 supports the pinion gears 210. The front differential casing 212 accommodates the pinion gear shaft 211, the pair of pinion gears 210 and the side gears 209R, 209L. The front differential 206 is arranged between the transmission 203 and the driving force interrupting device 3.

The rear differential 207 includes side gears 214R, 214L, a pair of pinion gears 215, a pinion gear shaft 216 and a rear differential casing 217. The side gear 214L is coupled to one axle shaft 213L on the rear wheel side. The side gear 214R is coupled to the other axle shaft 213R on the rear wheel side through the driving force transmission device 1. The pinion gears 215 are respectively meshed with the side gears 214R, 214L with the gear axis of the pinion gears 215 being orthogonal to the gear axis of the side gears 214R, 214L. The pinion gear shaft 216 supports the pinion gears 215. The rear differential casing 217 accommodates the pinion gear shaft 216, the pinion gears 215 and the side gears 214R, 214L. The rear differential 207 is arranged among the propeller shaft 2, the driving force transmission device 1, and the axle shaft 213L.

The engine 202 outputs a driving force to the axle shafts 208R, 208L on the front wheel through the transmission 203 and the front differential 206, so as to drive the right and left front wheels 204R, 204L.

The engine 202 outputs the driving force to the one axle shaft 213L through the transmission 203, the driving force interrupting device 3, the propeller shaft 2 and the rear differential 207, so as to drive the left rear wheel 205L. Further, the engine 202 outputs the driving force to the other axle shaft 213R through the transmission 203, the driving force interrupting device 3, the propeller shaft 2, the rear differential 207 and the driving force transmission device 1, so as to drive the right rear wheel 205R.

The propeller shaft 2 is arranged between the driving force transmission device 1 and the driving force interrupting device 3. Further, the propeller shaft 2 is configured to receive the driving force of the engine 202 from the front differential casing 212, and to transmit the driving force from the front wheels 204R, 204L-side to the rear wheels 205R, 205L-side.

A front wheel side gear mechanism 22, which is constituted by a drive pinion 220 and a ring gear 221 that are meshed with each other, is arranged at a front wheel side end portion of the propeller shaft 2. A rear wheel side gear mechanism 23, which is constituted by a drive pinion 230 and a ring gear 231 that are meshed with each other, is arranged at a rear wheel side end portion of the propeller shaft 2.

The driving force interrupting device 3 is constituted by a dog clutch having a first spline tooth portion 30, a second spline tooth portion 31 and a sleeve 32. The first spline tooth portion 30 is not rotatable relative to the front differential casing 212. The second spline tooth portion 31 is not rotatable relative to the ring gear 221. The sleeve 32 can be spline-fitted to both the first spline tooth portion 30 and the second spline tooth portion 31. The driving force interrupting device 3 is arranged closer to the front wheels 204R, 204L than the propeller shaft 2. The sleeve 32 is moved back and forth along the axle shaft 208R by an actuator (not shown) that is controlled by the control device C0. Further, the driving force interrupting device 3 is configured so as to couple the propeller shaft 2 and the front differential casing 212 so that the propeller shaft 2 and the front differential casing 212 are able to be disconnected from each other.

The control device C0 includes a storage portion C1, a control portion C2 and a motor control circuit C3. The storage portion C1 is constituted by memory elements such as a Read Only Memory (ROM) and a Random Access Memory (RAM). The control portion C2 includes a Central Processing Unit (CPU) that is operated according to programs stored in the storage portion C1, and the like. The motor control circuit C3 controls an electric motor 5 in the driving force transmission device 1 that will be described later.

Further, several sensors that detect operating conditions of various component portions of the four wheel drive vehicle 200 are connected to the control device C0. These several sensors include an accelerator operation amount sensor 901, an engine speed sensor 902, a gear sensor 903 and wheel speed sensors 904 to 907. The accelerator operation amount sensor 901 detects a depression amount of an accelerator pedal 202a operated by a driver. The engine speed sensor 902 detects a speed of the engine 202. The gear sensor 903 detects a speed ratio of the transmission 203. The wheel speed sensors 904 to 907 detect rotation speeds of the left front wheel 204L, the right front wheel 204R, the left rear wheel 205L and the right rear wheel 205R, respectively.

Figure 2:
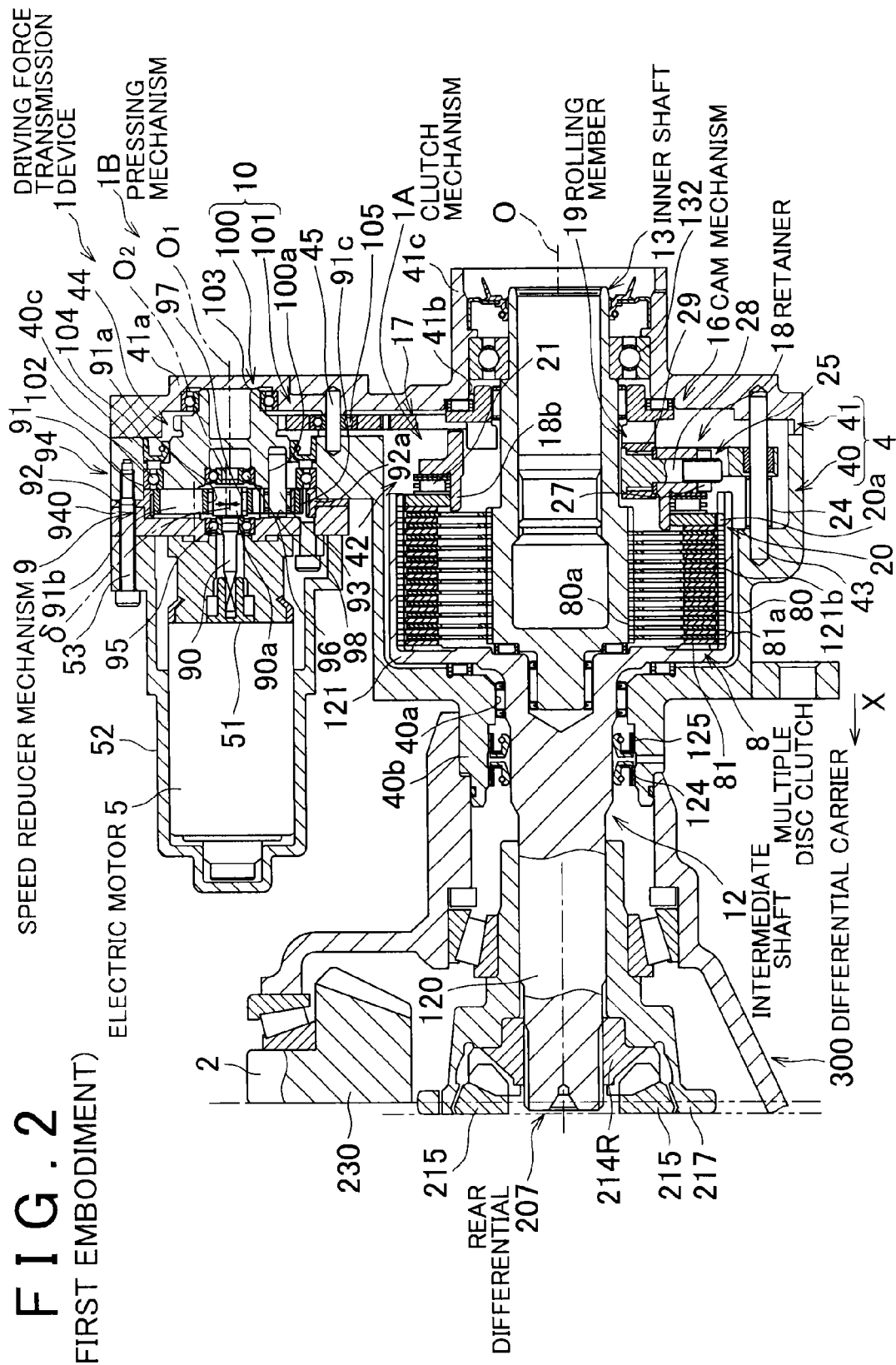
FIG. 2 is a sectional view showing a driving force transmission device according to the first embodiment.
Figure 3:
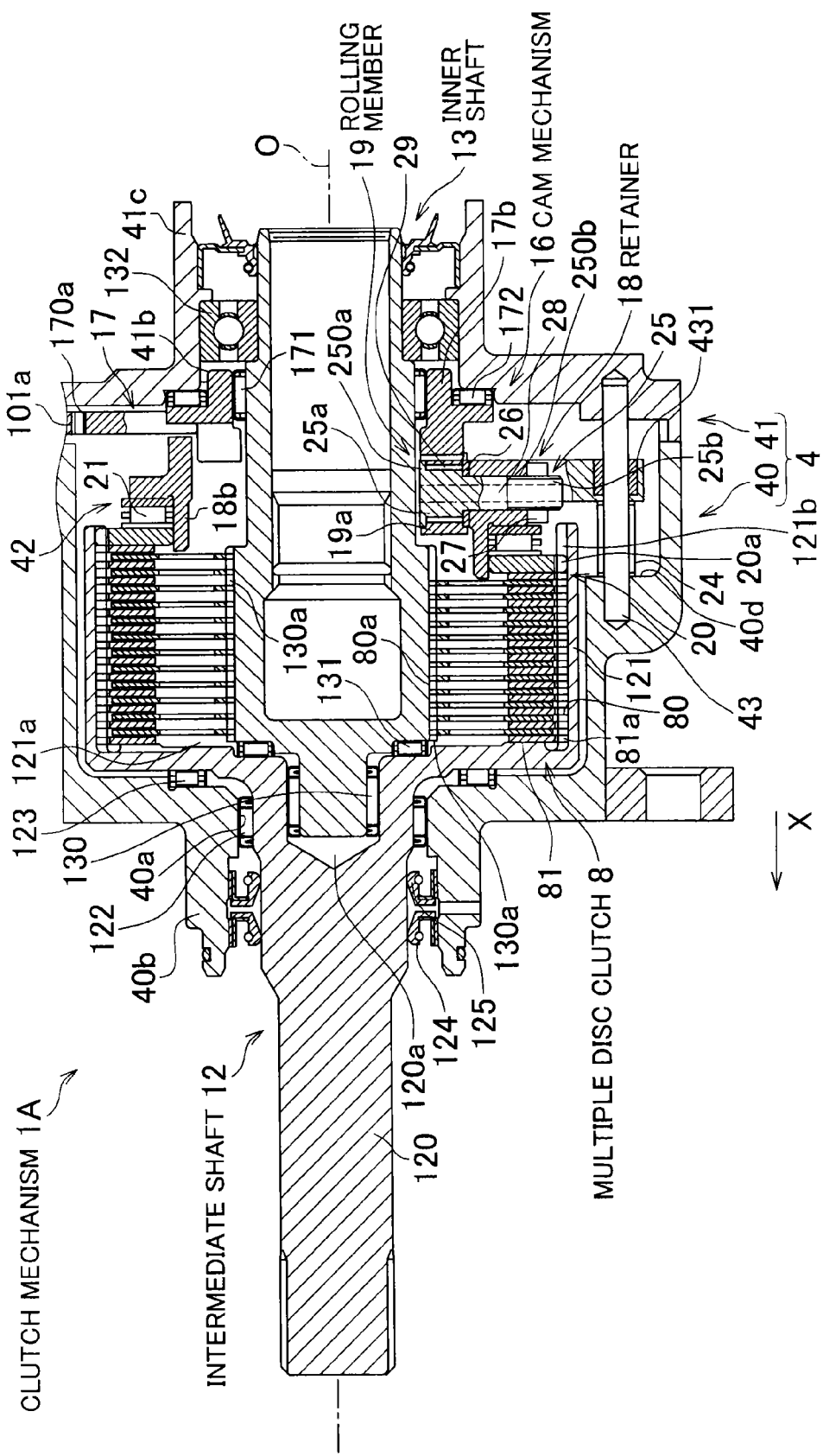
FIG. 3 is a sectional view showing a clutch mechanism of the driving force transmission device according to the first embodiment.

FIG. 2 is a sectional view showing the driving force transmission device 1. FIG. 3 is a sectional view showing a clutch mechanism 1A of the driving force transmission device 1.

The driving force transmission device 1 includes the clutch mechanism 1A and a pressing mechanism 1B. The clutch mechanism 1A includes a multiple disc clutch 8. The pressing mechanism 1B presses the multiple disc clutch 8 in a direction of the rotation axis. Further, the clutch mechanism 1A includes an intermediate shaft 12, and an inner shaft 13. The intermediate shaft 12 is an outer rotary member coupled to the side gear 214R of the rear differential 207. The inner shaft 13 is an inner rotary member coupled to the axle shaft 213R. The clutch mechanism 1A transmits a driving force between the side gear 214R and the axle shaft 213R. The pressing mechanism 1B includes the electric motor 5, a speed reducer mechanism 9, a gear transmission mechanism 10 and a cam mechanism 16. The speed reducer mechanism 9 reduces the rotation speed of a motor shaft 51 that is an output shaft of the electric motor 5. The gear transmission mechanism 10 transmits a torque of the electric motor 5 to the cam mechanism 16 after the rotation speed of the motor shaft 51 is reduced by the speed reducer mechanism 9. The cam mechanism 16 is a conversion mechanism that converts the torque that is transmitted from the electric motor 5 through the speed reducer mechanism 9 and the gear transmission mechanism 10, to a pressing force for pressing the multiple disc clutch 8. The electric motor 5 of the pressing mechanism 1B is controlled by the control portion C2 of the control device C0. The configuration of each portion of the driving force transmission device 1 will be hereinafter described in detail.

The clutch mechanism 1A and the pressing mechanism 1B are accommodated in a device casing 4. The device casing 4 is constituted by a casing body 40 and a casing cover 41. The casing body 40 is opened toward one side in the direction of the rotation axis O (toward the right side in FIG. 2). The casing cover 41 closes the opening portion of the casing body 40. A main accommodation space 42 for accommodating the cam mechanism 16, the multiple disc clutch 8 and the like is defined in the device casing 4.

An intermediate shaft insertion hole 40a and a cylindrical portion 40b are formed in the casing body 40. A shaft-shaped first element 120 of the intermediate shah 12 is inserted in the intermediate shaft insertion hole 40a. The cylindrical portion 40b projects from an outside opening edge defining the intermediate shaft insertion hole 40a, in the axial direction of the cylindrical portion 40b. A differential carrier 300 is arranged around an outer periphery of the cylindrical portion 40b.

Further, a fitting portion 40c for fitting the electric motor 5 is provided integrally with the casing body 40. A plurality of guides 43, which is constituted by a plurality of round pins (three round pins in this embodiment) having axes in parallel with the rotation axis O, is fitted between the casing body 40 and the casing cover 41. The guides 43 are arranged around the rotation axis O at equal angular intervals.

A cover portion 41a that is opposed to the fitting portion 40c of the casing body 40, the speed reducer mechanism 9 and the like, is provided in the casing cover 41. A subsidiary accommodation space 44 communicating with the main accommodation space 42 is defined between the cover portion 41a and the fitting portion 40c. A support shaft 45 that is in parallel with the guides 43 is fitted to both the cover portion 41a and the fitting portion 40c. Further, a shaft insertion hole 41b, through which the inner shaft 13 is inserted, is formed in the casing body 40, and a cylindrical portion 41c, which projects from an outside opening peripheral edge defining the shaft insertion hole 41b in the axial direction of the shaft insertion hole 41b, is also provided in the casing body 40.

The electric motor 5 is accommodated in a motor housing 52 that is secured to the casing body 40 by bolts 53. The electric motor 5 has the motor shaft 51 that is coupled to the cam mechanism 16 (a cam member 17 that will be explained later) through the speed reducer mechanism 9 and the gear transmission mechanism 10. Thus, the rotation speed of the motor 50 is reduced by the speed reducer mechanism 9, and the torque of the electric motor 5 is transmitted from the speed reducer mechanism 9 to a gear portion 170a of the cam member 17 through the gear transmission mechanism 10.

Figure 4:
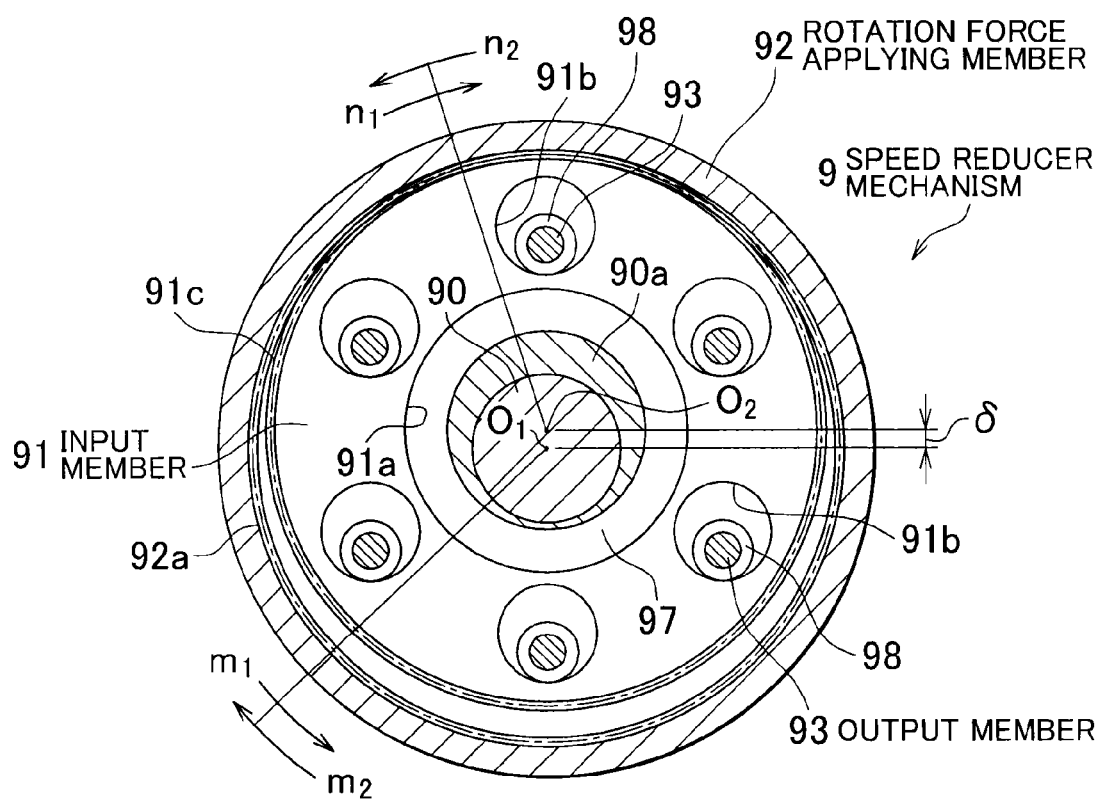
FIG. 4 is a schematic view showing a speed reducer mechanism according to the first embodiment.

FIG. 4 is a schematic view showing the speed reducer mechanism 9. In this embodiment, the speed reducer mechanism 9 is an involute speed reducer mechanism having a small tooth number difference. The speed reducer mechanism 9 includes a rotary shaft 90, an input member 91, a rotation force applying member 92 and a plurality (six in this embodiment) of output members 93. The speed reducer mechanism 9 is accommodated in a speed reducer housing 94. Further, the speed reducer mechanism 9 reduces the rotation speed of the electric motor 5, and transmits the rotation, whose speed has been reduced, to the gear transmission mechanism 10.

The rotary shaft 90 has an eccentric portion 90a having an eccentric axis $O_2$ as a central axis. The eccentric axis $O_2$ is eccentric from the axis $O_1$ (corresponding to the rotation central axis $O_1$ of the rotary shaft 90) of the motor shaft 51 of the electric motor 5 by an eccentric amount 6, and extends in parallel with the axis $O_1$. Further, the rotary shaft 90 is coupled to the motor shaft 51, and the rotary shaft 90 is supported by a housing element 940 of the speed reducer housing 94 and a first gear 100 of the gear transmission mechanism 10 through ball bearings 95, 96, respectively.

The input member 91 is constituted by an external gear that has the axis $O_2$ as a central axis, and has a center hole 91. The input member 91 is rotatably supported by the rotary shaft 90 with a needle roller bearing 97 being interposed between an inner peripheral surface of the input member 91 defining the center hole 91a and an outer peripheral surface of the eccentric portion 90a. The input member 91 receives the torque from the electric motor 5 so as to perform circular motion (the axis $O_2$ performs orbital motion around the axis $O_1$) in directions indicated by the arrows $m_1$, $m_2$ in FIG. 4 with the eccentric amount δ.

In the input member 91, a plurality of (six in this embodiment) pin insertion holes 91b as a plurality of through-holes is formed at equal angular intervals around the axis $O_2$ so as to extend in parallel with each other. External teeth 91c, which have an involute tooth profile with a pitch circle around the axis $O_2$ as a central axis, are formed in an outer peripheral surface of the input member 91.

The rotation force applying member 92 is an internal gear having the axis $O_1$ as a central axis. The rotation force applying member 92 is meshed with the input member 91, and applies a rotation force in directions indicted by the arrows n1, n2, to the input member 91 that receives the torque from the electric motor 5 and revolve. Internal teeth 92a meshed with the external teeth 91c of the input member 91 and having an involute tooth profile are formed in an inner peripheral surface of the rotation force applying member 92.

The output members 93 are constituted by pins having a substantially uniform outer diameter. The output members 93 are inserted in the respective pin insertion holes 91b of the input member 91 and are fitted in pin fitting holes 100a of the first gear 100 in the gear transmission mechanism 10. Further, the output members 93 receive the rotation force applied by the rotation force applying member 92 from the input member 91, and output the rotation force to the first gear 100. A needle roller bearing 98 is fitted to an outer peripheral surface of each of the output members 93.

The gear transmission mechanism 10 includes the first gear 100 and a second gear 101. The first gear 100 is arranged on the axis $O_1$ of the rotary shaft 90. Further, the first gear 100 is rotatably supported in the device casing 4 through ball bearings 102, 103. A sealing mechanism 104 is arranged around an outer periphery of the first gear 100 and between the first gear 100 and an inner peripheral surface of the fitting portion 40c. The second gear 101 is meshed with the first gear 100 and is rotatably supported by the support shaft 45 through a ball bearing 105.

As shown in FIG. 3, the multiple disc clutch 8 is a frictional clutch including a plurality of inner clutch plates 80 and a plurality of outer clutch plates 81. The inner clutch plates 80 and the outer clutch plates 81 are arranged in the direction of the rotation axis O so as to extend in parallel with each other. The multiple disc clutch 8 is arranged between the intermediate shaft 12 and the inner shaft 13.

Further, in the multiple disc clutch 8, the inner clutch plates 80 are frictionally engaged with, and disengaged from the outer clutch plates 81, and thus, the multiple disc clutch 8 couples the intermediate shaft 12 with the inner shaft 13 to transmit a driving force between the intermediate shaft 12 and the inner shaft 13. The inner clutch plates 80 and the outer clutch plates 81 are alternately arranged along the rotation axis O.

Each of the inner clutch plates 80 has a straight spline engagement portion 80a in its inner peripheral portion. The straight spline engagement portions 80a of the inner clutch plates 80 are engaged with outer peripheral spline teeth 130a formed in an outer peripheral surface of the inner shaft 13 so that the inner clutch plates 80 are not rotatable relative to the inner shaft 13, and are axially movable.

Each of the outer clutch plates 81 has a straight spline engagement portion 81a in its outer peripheral portion. The straight spline engagement portions 81a of the outer clutch plates 81 are engaged with inner peripheral spline teeth 121b formed in an inner peripheral surface of the intermediate shaft 12 so that the outer clutch plates 81 are not rotatable relative to the intermediate shaft 12, and are axially movable.

As shown in FIG. 3, the intermediate shaft 12 is constituted by a first element 120 and a second element 121, and is arranged on the rotation axis O of the axle shaft 213R on the rear wheel side. Further, the intermediate shaft 12 is rotatably supported in the device casing 4 through needle roller bearings 122, 123.

The first element 120 is constituted by a shaft-shaped member having the rotation axis O as its axis, and arranged in an end portion of the intermediate shaft 12 on one side (on the left side in FIG. 2). Further, the first element 120 is coupled to the side gear 214R by spline-fitting. Seal mechanisms 124, 125 are interposed between an outer peripheral surface of the first element 120 and an inner peripheral surface of the cylindrical portion 40b. A recess 120a, which is constituted by a round hole opened toward the cam mechanism 16, is formed in the first element 120.

The second element 121 is arranged in an end portion of the intermediate shaft 12 on the other side (on the right side in FIG. 2) and is formed in a shape of a bottomed cylinder. An accommodation space 121a opened toward the cam mechanism 16 is formed in the second element 121. The accommodation space 121a communicates with both the recess 120a of the first element 120 and the main accommodation space 42 of the device casing 4. Further, a plurality of inner peripheral spline teeth 121b extending in a direction in parallel with the rotation axis O is formed in an inner peripheral surface of the second element 121.

A portion of the inner shaft 13 is accommodated in the second element 121 of the intermediate shaft 12, and the inner shaft 13 is supported on the same axis as the axis of the intermediate shaft 12 (i.e., on the rotation axis O) so as to be rotatable relative to the intermediate shaft 12. Further, the inner shaft 13 is supported by the intermediate shaft 12 through needle roller bearings 130, 131, and is also rotatably supported by the casing cover 41 through a ball bearing 132. Further, the inner shaft 13 has a shape of a bottomed cylinder opened toward one side in the direction of the axis of the inner shaft 13 (toward the rear wheel 205R shown in FIG. 1). The axle shaft 213R (shown in FIG. 1) on the rear wheel side is inserted in the opening of the inner shaft 13. Thus, the inner shaft 13 is coupled to the axle shaft 213R by spline-fitting so that the inner shaft 13 and the axle shaft 213R are not rotatable relative to each other, and are axially movable relative to each other.

Figure 5:
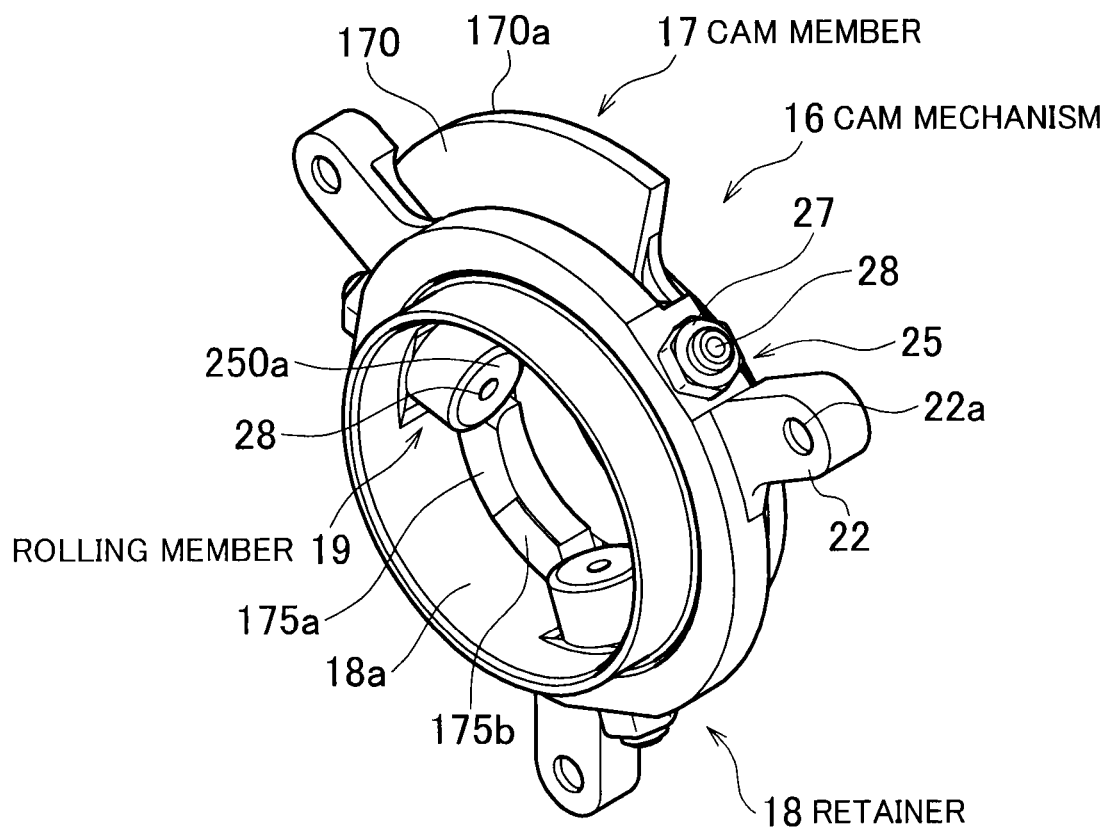
FIG. 5 is a perspective view showing a cam mechanism according to the first embodiment.

FIG. 5 is a perspective view showing the cam mechanism 16. The cam mechanism 16 includes the cam member 17, a retainer 18 and rolling members 19, and is arranged around an outer periphery of the inner shaft 13. The cam mechanism 16 converts the torque of the electric motor 5 to a cam thrust force for pressing the multiple disc clutch 8.

Figure 6:
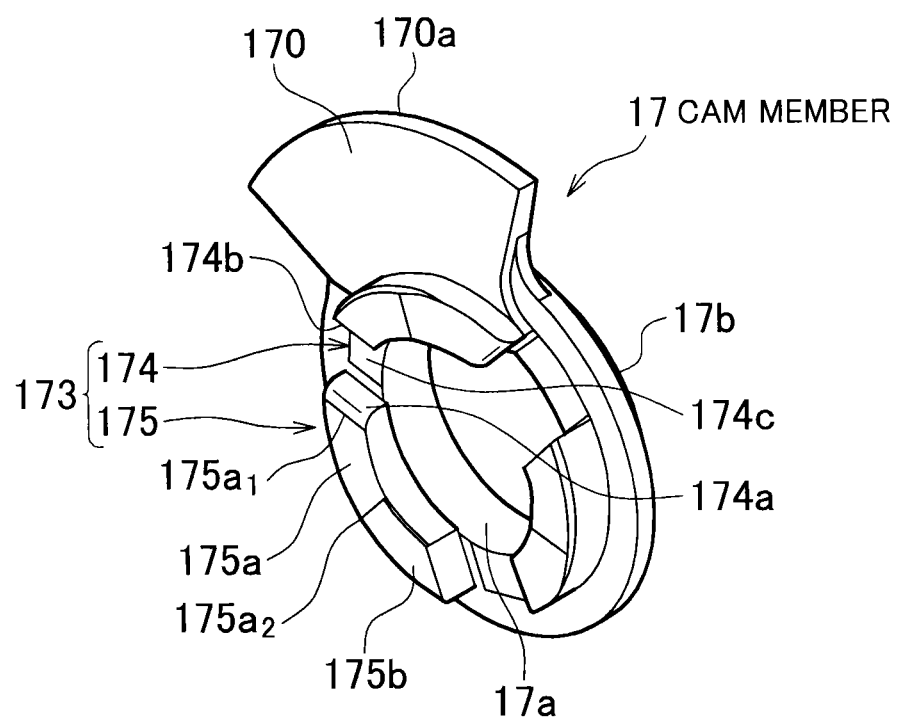
FIG. 6 is a perspective view showing a cam member according to the first embodiment.

FIG. 6 is a perspective view showing the cam member 17. The cam member 17 has a shaft insertion hole 17a through which the inner shaft 13 is inserted. A fan-shaped protrusion piece 170 is formed so as to radially project from an outer peripheral edge of the cam member 17. A gear portion 170a that is meshed with the second gear 101 in the gear transmission mechanism 10 is formed in the protrusion piece 170.

A cylindrical portion 17b is formed at an end face of the cam member 17 on one side in the direction of the axis of the cam member 17. The cylindrical portion 17b projects toward the rear wheel 205R (shown in FIG. 1) from an opening peripheral edge defining the shaft insertion hole 17a. A needle roller bearing 171 (shown in FIG. 3) is interposed between an inner peripheral surface of the cylindrical portion 17b and an outer peripheral surface of the cylindrical portion 13c of the inner shaft 13. A needle roller bearing 172 (shown in FIG. 3) is interposed between the cam member 17 and the casing cover 41. An uneven surface 173, which serves as a cam surface opposed to the multiple disc clutch 8, is formed at an end face of the cam member 17 on the other side in the direction of the axis of the cam member 17 (on the left side in FIG. 2).

The uneven surface 173 includes a plurality of recessed portions 174 and a plurality of protruding portions 175. The recessed portions 174 and the protruding portions 175 are alternately arranged around the axis of the cam member 17. The uneven surface 173 rolls the rolling members 19 so as to apply a cam thrust force in the direction along the rotation axis O to the rolling members 19. Each of the recessed portions 174 is formed of a cutout portion that has a substantially rectangular sectional shape and that includes a pair of cutout side surfaces 174a, 174b having a substantially uniform width, and a cutout bottom surface 174c provided between the cutout side surfaces 174a, 174b.

Each of the protruding portions 175 is arranged between two of the recessed portions 174. An end face of each of the protruding portions 175, which is at the rolling member 19-side, is constituted by a first surface 175a and a second surface 175b that are circumferentially adjacent to each other. The first surface 175a has a leading end portion $175a_1$ and a trailing end portion $175a_2$. The first surface 175a is formed of a raceway surface constituted by an inclined surface formed such that the axial thickness of the cam member 17 (the protruding height of the protruding portion 175) is gradually increased from the recessed portion 174-side to the second surface 175b (along the circumferential direction of the cam member 17). The second surface 175b is formed of a flat surface formed such that the axial thickness of the cam member 17 is substantially uniform.

Figure 7:
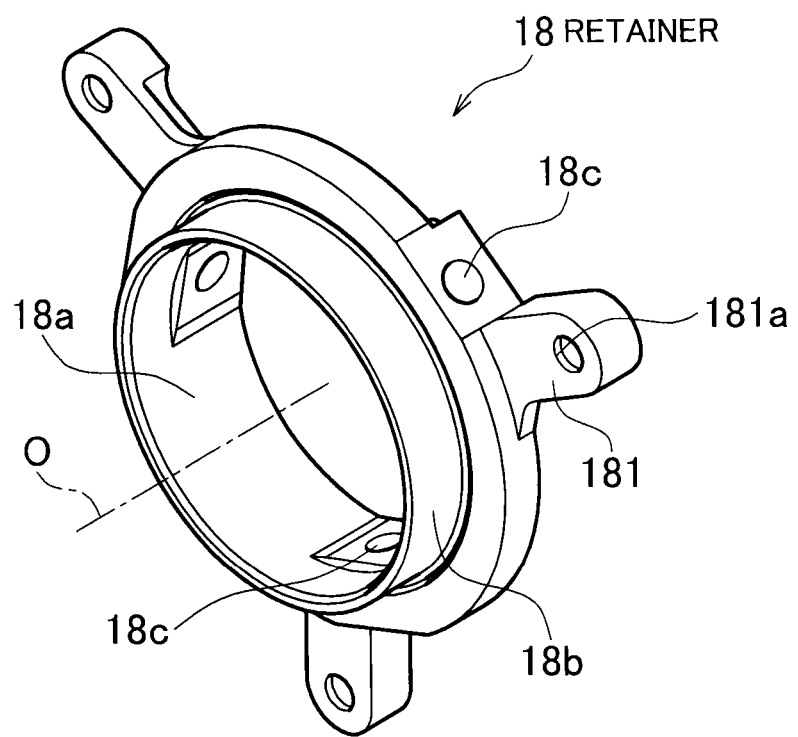
FIG. 7 is a perspective view showing a retainer according to the first embodiment.

FIG. 7 is a perspective view showing the retainer 18. The retainer 18 has a shaft insertion hole 18a through which the inner shaft 13 is inserted. The retainer 18 is arranged at an end portion of the cam mechanism 16 on the other side (on the left side in FIG. 2), and is formed of a ring member that is movable in the direction of the rotation axis O. Further, the rotation of the retainer 18 is restricted by the guides 43 (shown in FIG. 2 and FIG. 3), and the retainer 18 outputs the cam thrust force toward the multiple disc clutch 8.

A cylindrical portion 18b is formed at one end face of the retainer 18 on the clutch-side. The cylindrical portion 18b projects toward the multiple disc clutch 8 from an opening peripheral edge defining the shaft insertion hole 18a. A ring-shaped pressing member 20 (shown in FIG. 2 and FIG. 3), which receives a first cam thrust force from the retainer 18, and presses the multiple disc clutch 8, is provided around an outer periphery of the cylindrical portion 18b. A straight spline fitting portion 20a fitted to the inner peripheral spline teeth 121b of the second element 121 of the intermediate shaft 12 is formed at an outer peripheral edge of the pressing member 20. A needle roller bearing 21 is interposed between an end face of the pressing member 20 on one side (the side opposite to the multiple disc clutch-side end face) and the clutch-side end face of the retainer 18.

The retainer 18 has a plurality (three in this embodiment) of protrusion pieces 181 that radially projects from an outer peripheral edge of the retainer 18. The protrusion pieces 181 are arranged at equal intervals in the circumferential direction of the retainer 18. A guide insertion hole 181a, through which the corresponding guide 43 is inserted, is formed in each of the protrusion pieces 181. A bearing bush 431 is interposed between an inner peripheral surface of the guide insertion hole 181a and an outer peripheral surface of the corresponding guide 43. A return spring 24 is interposed between an opening peripheral edge defining the guide insertion hole 181a and a spring retaining surface 40d of the casing body 40. A plurality (three in this embodiment) of pin insertion holes 18c is formed in the retainer 18. The pin insertion holes 18c are opened at inner and outer peripheral surfaces of the retainer 18, and support pins 25 are inserted through the pin insertion holes 18c.

Each of the support pins 25 has two large and small body portions 25a, 25b (large diameter body portion 25a and small diameter body portion 25b) having different outer diameters. The support pin 25 is fitted to the retainer 18 in a condition in which the axial movement of the support pin 25 is restricted by the large diameter body portion 25a and a nut 27. A core 28 is embedded in the support pin 25.

The large diameter body portion 25a is located in one axial side (rotation axis O-side) end portion of the support pin 25 in a condition in which the large diameter body portion 25a is exposed to the interior of the shaft insertion hole 18a. The large diameter body portion 25a has an outer peripheral surface that serves as an inner raceway surface for needle rollers 29. The large diameter body portion 25a has a flange 250a that projects from an outer peripheral surface of the large diameter body portion 25a at the end portion on the rotation axis O-side, and that is opposed to a roller retaining member 26 across the needle rollers 29.

The small diameter body portion 25b is located in the other axial side (guide 34-side) end portion in a condition in which the small diameter body portion 25b is inserted in the pin insertion hole 18c. A thread portion 250b, to which the nut 27 is screwed (coupled), is formed in the small diameter body portion 25b.

Each of the rolling members 19 is arranged on the axis L of the corresponding pin insertion hole 18c within the shaft insertion hole 18a. Further, the rolling member 19 is rotatably supported on the outer peripheral surface of the large diameter body portion 25a through the needle rollers 29, and is formed in a bottomless cylindrical shape. Further, an outer peripheral surface of the rolling member 19 rolls on the uneven surface 173. A cylindrical protrusion 19a, which projects toward the needle rollers 29, is formed at an axially center portion of the rolling member 19. An inner peripheral surface of the protrusion 19a serves as an outer raceway surface for the needle rollers 29.

Next, the operation of the driving force transmission device described in this embodiment will be described.

Referring to FIG. 1, in the two wheel drive mode of the four wheel drive vehicle 200, a rotational driving force of the engine 202 is transmitted to the front differential 206 through the transmission 203, and then is transmitted from the front differential 206 to the front wheels 204R, 204L through the front axle shafts 208R, 208L on the front wheel side.

In the two wheel drive mode, a torque cannot be transmitted between the first spline tooth portion 30 and the second spline tooth portion 31 in the driving force interrupting device 3. Further, since the electric motor 5 is de-energized, a torque of the electric motor 5 is not transmitted to the cam mechanism 16 through the speed reducer mechanism 9 and the gear transmission mechanism 10, and accordingly, the cam mechanism 16 is not operated. Further, each of the rolling members 19 is located at a position where the rolling member 19 abuts on the cutout bottom surface 174c (shown in FIG. 6)

of the recessed portion 174. Thus, the inner clutch plates 80 and the outer clutch plates 81 are not frictionally engaged with each other. Accordingly, although the inner shaft 13 is rotated following the of the of the right rear wheel 205R due to traveling, the intermediate shaft 12 is not rotated following the rotation of the inner shaft 13.

The intermediate shaft 12 is rotated in a direction opposite to the rotating direction of the inner shaft 13, following the rotation of the side gear 214L of the rear differential 207, the pinion gears 215 and the side gear 214R that follow the rotation of the left rear wheel 205L and the axle shaft 213L due to traveling. That is, the side gears 214R, 214L and the pinion gears 215 in the rear differential 207 are idling, and accordingly, no driving force is transmitted from the engine 202 to either of the rear wheels 205R, 205L.

Meanwhile, in order to change the drive mode of the four wheel drive vehicle 200 from the two wheel drive mode into the four wheel drive mode, the propeller shaft 2 and the axle shaft 213R on the rear wheel side are coupled to each other by the driving force transmission device 1 so that a torque can be transmitted. Thereafter, the rotation speed of the propeller shaft 2 is increased, and when the rotation of the first spline tooth portion 30 and the rotation of the second spline tooth portion 31 are synchronized with each other, the sleeve 32 is moved by the actuator and then is spline-fitted to the first spline tooth portion 30 and the second spline tooth portion 31. Thus, the front differential casing 212 and the propeller shaft 2 are coupled with each other by the driving force interrupting device 3 so that the driving force can be transmitted.

At this stage, in order to couple the propeller shaft 2 with the axle shaft 213R on the rear wheel side, a motor torque of the electric motor 5 is applied to the earn mechanism 16 so that the cam mechanism 16 is operated. In this case, when the cam mechanism 16 is operated, the cam member 17 is rotated in one direction (direction in which the retainer 18 is moved in the direction of the arrow X) around the rotation axis O.

Accordingly, the rolling members 19 roll from the state (initial state) in which the rolling members 19 are located in the recessed portions 174 of the uneven surface 173 of the cam member 17 shown in FIG. 6, and move onto the first surfaces 175a of the protruding portions 175 of the cam member 17, and then are located at the leading end portions 175$a_1$. At this time, in the cam mechanism 16, the torque (rotating force) of the electric motor 5 is converted to a pressing force for pressing the inner clutch plates 80 and the outer clutch plates 81 in the multiple disc clutch 8.

As a result, the rolling members 19 are moved toward the multiple disc clutch 8 (in the direction of the arrow X) along the rotation axis O, and press the retainer 18 through the needle rollers 29 and the support pins 25 in the direction of this movement. Thus, the retainer 18 is moved in the direction of the arrow X against the spring force of the return spring 24 so as to press the pressing member 20 in the direction in which the inner clutch plates 80 and the outer clutch plates 81 approach to each other.

Thus, the pressing member 20 presses the inner clutch plates 80 and the outer clutch plates 81 in the direction of the arrow X, and the gaps between adjacent two clutch plates among the inner clutch plates 80 and the outer clutch plates 81 are reduced. Thus, the inner clutch plates 80 and the outer clutch plates 81 are brought into contact with each other.

Next, when the cam member 17 is rotated in one direction around the rotation axis O by a motor torque received from the electric motor 5, the rolling members 19 roll on the first surfaces 175a toward the second surfaces 175b of the protruding portions 175 shown in FIG. 6. Thereafter, the rolling members 19 reach the trailing end portions 175$a_2$ of the first surfaces 175a, and then move onto the second surfaces 175b of the protruding portions 175. As a result, the retainer 18 is moved in the direction of the arrow X against the spring force of the return spring 24 so as to press the pressing member 20 in the direction in which the inner clutch plates 80 and the outer clutch plates 81 are frictionally engaged with each other.

Thus, the pressing member 20 presses the inner clutch plates 80 and the outer clutch plates 81 in the direction of the arrow X, and the two adjacent clutch plates are frictionally engaged with each other. Thus, the driving force of the engine 202 is transmitted from the intermediate shaft 12 to the inner shaft 13, then to the rear wheel 205R through the axle shaft 213R on the rear wheel side, and in addition, the driving force is transmitted to the rear wheel 205L through the axle shaft 213L on the rear wheel side.

With the use of the driving force transmission device 1 constituted as stated above, a relationship between a motor current supplied to the electric motor 5 and a driving force transmitted from the intermediate shaft 12 to the inner shaft 13 was measured. As a result, there was confirmed the phenomenon that the transmitted driving force is different between the case where the inner clutch plates 80 and the outer clutch plates 81 were frictionally engaged with each other in a condition in which there is relative rotation between the intermediate shaft 12 and the inner shaft 13, and the case where the inner clutch plates 80 and the outer clutch plates 81 were frictionally engaged with each other in a condition in which there is not relative rotation between the intermediate shaft 12 and the inner shaft 13.

The reason is considered to be that the relative positional relationship between the intermediate shaft 12 and the inner shaft 13, and the outer clutch plates 81 and the inner clutch plates 80 is different between the case where the outer clutch plates 81 and the inner clutch plates 80 are pressed in the condition in which there is differential rotation between the intermediate shaft 12 and the inner shaft 13, and the case where the outer clutch plates 81 and the inner clutch plates 80 are pressed in the condition in which there is not differential rotation between the intermediate shaft 12 and the inner shaft 13. Specifically, it is considered that the friction between the straight spline engagement portions 81a of the outer clutch plates 81 and the inner peripheral spline teeth 121b of the intermediate shaft 12 and the friction between the straight spline engagement portions 80a of the inner clutch plates 80 and the outer peripheral spline teeth 130a of the inner shaft 13 relate to the above-described phenomenon.

The control device C0 increases or decreases the motor current supplied to the electric motor 5 in accordance with a difference in rotation speed between the front wheels 204R, 204L and the rear wheels 205R, 205L and the depression amount of the accelerator pedal 202a, so as to adjust the driving force transmitted by the driving force transmission device 1. However, it is not preferable, in view of appropriate driving force distribution, that the transmitted driving force varies depending upon the state of the differential rotation between the intermediate shaft 12 and the inner shaft 13 when the multiple disc clutch 8 is pressed.

In this embodiment, the above-described problem is resolved with the use of the following processing executed by the control portion C2. That is, the control portion C2 makes a determination as to whether the multiple disc clutch 8 is in a first operating condition in which the multiple disc clutch 8 is pressed with the relative rotation speed between the intermediate shaft 12 and the inner shaft 13 being equal to or higher than a predetermined value, or a second operating condition in which the multiple disc clutch 8 is pressed with the relative rotation speed between the intermediate shaft 12 and the inner shaft 13 being lower than the predetermined value, and the control portion C2 controls the pressing mechanism 1B on the basis of the result of the determination. Further, in the case where the result of the determination indicates the first operating condition, the control portion C2 increases the pressing force for pressing the multiple disc clutch 8 applied by the pressing mechanism 1B, as compared to the case where the result of the determination indicates the second operating condition.

Further, the control portion C2 controls the pressing mechanism 1B by selectively referring to a first characteristic torque map and a second characteristic torque map each of which defines a relationship between a drive command value as to a driving force to be transmitted between the intermediate shaft 12 and the inner shaft 13, and a control target value relating to a pressing force to be generated by the pressing mechanism 1B. The first characteristic torque map and the second characteristic torque map are stored in the storage portion C1. In the second characteristic torque map, the control target value is set so that the pressing force generated by the pressing mechanism 1B is smaller than that in the first characteristic torque map. The content of the processing executed by the control portion C2 will be described with reference to the drawings.

Figure 8:
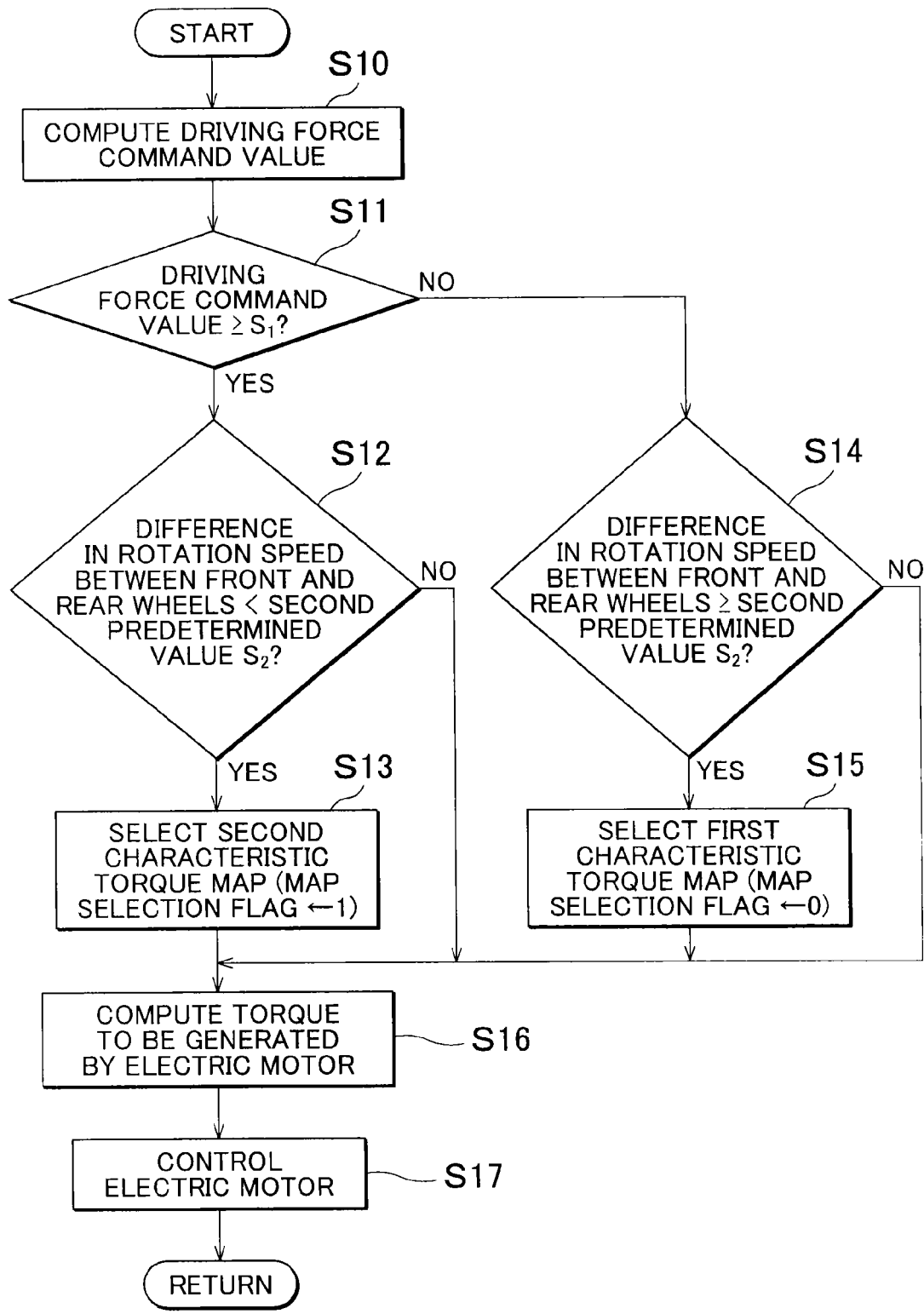
FIG. 8 is a flowchart showing a specific example of processing executed by a control portion according to the first embodiment.

FIG. 8 is a flowchart showing a specific example of processing executed by the control portion C2. The control portion C2 executes the processing shown in this flow chart, repeatedly at predetermined control intervals (for example, at control intervals of 100 ms).

The control portion C2 computes a driving force to be transmitted between the intermediate shaft 12 and the inner shaft 13, as a driving force command value, on the basis of a vehicle traveling condition detected by the sensors (accelerator operation amount sensor 901, engine speed sensor 902, gear sensor 903, front wheel speed sensors 904, 905 and rear wheel speed sensors 906, 907) (Step S10). The driving force command value is set by computation in the control portion C2 on the basis of, for example, a difference between an averaged rotation speed of the front wheels 204R, 204L and an averaged rotation speed of the rear wheels 205R, 205L (a difference in rotation speed between the front and rear wheels), and the depression amount of the accelerator pedal 202a (an acceleration operation amount).

The intermediate shaft 12 is coupled to the front wheels 204R, 204L-side, and the inner shaft 13 is coupled to the rear wheels 205R, 205L-side. Thus, in the case where the first spline tooth portion 30 and the second spline tooth portion 31 in the driving force interrupting device 3 are coupled by the sleeve 32, the relative rotation speed between the intermediate shaft 12 and the inner shaft 13 is in accordance with the difference in rotation speed between the front and rear wheels, that is, the relative rotation speed between the intermediate shaft 12 and the inner shaft 13 is in proportion to the difference in rotation speed between the front and rear wheels.

It is to be noted that the difference in rotation speed between the front and rear wheels can be obtained as the absolute value of a difference between an averaged rotation speed of the right and left front wheels 204R, 204L computed from detected values of the front wheel speed sensors 905, 904, and an averaged rotation speed between the right and left rear wheels 205R, 205L computed from detected values of the rear wheel speed detecting sensors 907, 906. The driving force command value may be computed by further taking into account the engine speed detected by the engine speed sensor 902, and the speed ratio of the transmission 203 detected by the gear sensor 903.

Next, the control portion C2 determines whether the driving force command value computed at Step S10 is equal to or larger than a first predetermined value $S_1$ (Step S11). If the driving force command value is equal to or larger than the first predetermined value $S_1$ (Yes at Step S11), the control portion C2 determines whether the difference in rotation speed between the front and rear wheels is smaller than a second predetermined value $S_2$ (Step S12). If the difference in rotation speed between the front and rear wheels is smaller than the second predetermined value $S_2$ (Yes at step S12), the control portion C2 selects a second characteristic torque map from the first and second characteristic torque maps, as a map used in the computation for a motor torque at Step S16 that will be described later (Step S13). Specifically, a map selection flag is set to "1" that indicates the second characteristic torque map. Thereafter, the control portion C2 executes the process at Step S16.

Meanwhile, if the driving force command value is smaller than the first predetermined value $S_1$ (No at Step S11), the control portion C2 determines whether the difference in rotation speed between the front and rear wheels is equal to or larger than the second predetermined value $S_2$ (Step S14). If the difference in rotation speed between the front and rear wheels is equal to or larger than the second predetermined value $S_2$ (Yes at Step S14), the control portion C2 selects a first characteristic torque map from the first characteristic torque map and the second characteristic torque map, as the map used in the computation for a motor torque at Step S16 that will be described later (Step S15). Specifically, the map selection flag is set to "0" that indicates the first characteristic torque map. Thereafter, the control portion C2 executes the process at Step S16.

It is to be noted here that the first predetermined value $S_1$ is the value at which substantially no driving force is transmitted between the intermediate shaft 12 and the inner shaft 13, and for example, the first predetermined value $S_1$ is the value equal to or smaller than 5% of an upper limit value of the driving force that can be transmitted between the intermediate shaft 12 and the inner shaft 13. For example, if the upper limit value of the driving force that can be transmitted between the intermediate shaft 12 and the inner shaft 13 is 1,000 N·m, the first predetermined value $S_1$ is equal to or smaller than 50 N·m. More preferably, the first predetermined value $S_1$ is equal to or smaller than 3% of the upper limit value of the driving force that can be transmitted between the intermediate shaft 12 and the inner shaft 13. Further, the second predetermined value $S_2$ is the value of a difference in rotation speed between the front and rear wheels in the case where the averaged rotation speed between the front wheels 204R, 204L is substantially equal to the averaged rotation speed between the rear wheels 205R, 206L, and for example, the second predetermined value $S_2$ is in a range of 2 to 5 rpm (revolutions per minute).

Further, if the difference in rotation speed between the front and rear wheels is equal to or larger than the second predetermined value $S_2$ at Step S12 (No at step S12) or if the difference in rotation speed between the front and rear wheels is smaller than the second predetermined value $S_2$ at Step S14 (No at Step S14), the process at step S16 is executed without changing the value of the map selection flag.

The control portion C2 computes a torque to be generated by the electric motor 5 at Step S16. This computation is executed by referring to the first characteristic torque map or the second characteristic torque map stored in the storage portion C1.

Figure 9:
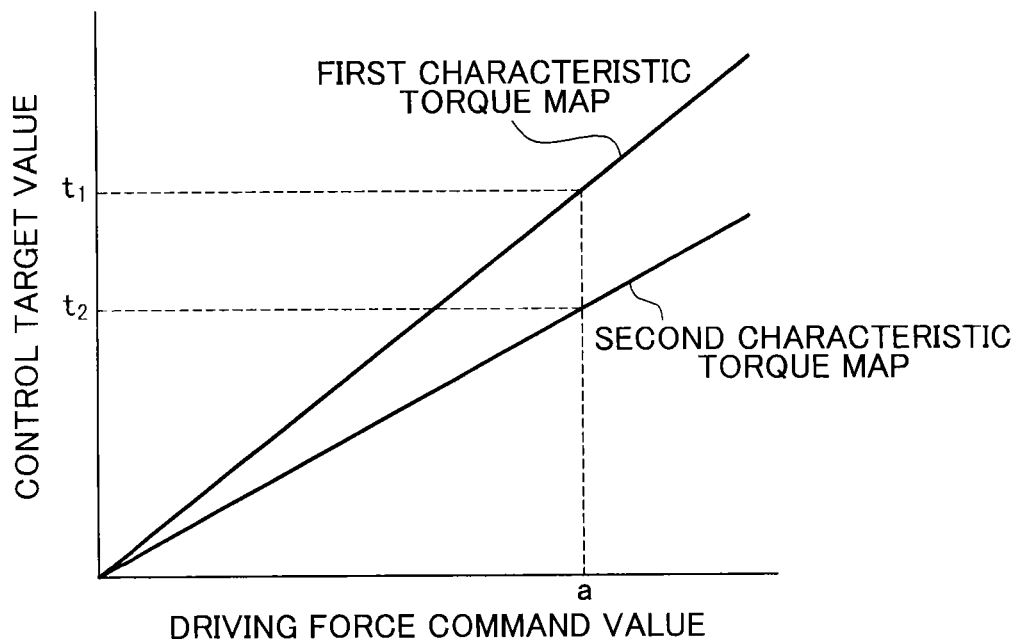
FIG. 9 is an explanatory diagram showing an example of a first characteristic torque map and a second characteristic torque map according to the first embodiment.

FIG. 9 shows an example of the first characteristic torque map and the second characteristic torque map. Each of these first and second characteristic torque maps defines the relationship between the driving force command value and the control target value relating to the pressing force to be generated by the pressing mechanism 1B. Specifically, the torque to be generated by the electric motor 5 can be defined as the control target value. Further, a rotation angle of the electric motor 5 may be defined as the control target value. It is to be noted that the rotation angle of the electric motor 5 indicates a number of revolutions from a reference position (origin) and an angle within one revolution, which are detected by, for example, a multi-rotation encoder provided in the electric motor 5. It is to be noted that an absolute type (absolute position detection type) encoder without the necessity of return to the origin may be preferably used as the above-described multi-rotation encoder.

In the following explanation, the case where a torque to be generated by the electric motor 5 (this torque will be hereinafter referred to as "torque target value") is defined as the control target value will be described. The first and second characteristic torque maps are stored in the form of, for example, functions, in the storage portion C1. As shown in FIG. 9, if the driving force command value is, for example, "a", the torque target value becomes t1 when the first characteristic torque map is referred to, and becomes t2 when the second characteristic torque map is referred to (t2<t1).

It is to be noted that the example shown in FIG. 9 indicates the case where the driving force command value and the torque target value are linearly and directly proportional to each other. However, the relationship between the driving force command value and the torque target value is not limited to the direct proportional relationship. For example, the relationship may be a relationship represented by a line graph or a curve. Further, it is preferable that the torque target value that is computed with the use of the second characteristic torque map should be 50 to 90% of the torque target value that is computed with the use of the first characteristic torque map. In other words, it is preferable that the proportion (t2/t1) of the torque value (for example, t2) that is computed with the use of the second characteristic torque map to the torque value (for example, t1) that is computed with the use of the first characteristic torque map should be equal to or larger than 0.5, and equal to or smaller than 0.9. Further, it is more preferable that the proportion (t2/t1) should be in a range of 0.6 to 0.8, that is, the proportion (t2/t1) should be equal to or larger than 0.6 and equal to or smaller than 0.8.

The control portion C2 computes the torque target value for the electric motor 5 with the use of the first characteristic torque map if the map selection flag is set to "0", and computes the torque target value for the electric motor 5 with the use of the second characteristic torque map if the map selection flag is set to "1".

Next, the control portion C2 outputs a Pulse width modulation (PWM) signal to the motor control circuit C3 on the basis of the torque target value computed at Step S16 so that a motor current in accordance with the torque target value is output to the electric motor 5 (Step S17). That is, the electric motor 5 is controlled so that the electric motor 5 outputs a torque in accordance with the torque target value.

It is to be noted that the electric motor 5 is controlled so that an actual rotation angle of the electric motor 5 coincides with the rotation angle (rotation angle target value) of the electric motor 5, which is computed by referring to the first characteristic torque map or the second characteristic torque map in the case where the rotation angle of the electric motor 5 is defined as the control target value. In this case, the rotation angle of the electric motor 5 obtained by referring to the second characteristic torque map is set so that the pressing force generated by the pressing mechanism 1B is smaller than the pressing force generated by the pressing mechanism 1B in the case where the rotation angle of the electric motor 5 is obtained by referring to the first characteristic torque map. That is, in the case where the electric motor 5 is controlled by referring to the second map, the pressing force generated by the pressing mechanism 1B becomes smaller than that in the case where the electric motor 5 is controlled by referring to the first characteristic torque map. The pressing force generated by the pressing mechanism 1B in the case where the actual rotation angle of the electric motor 5 is caused to coincide with the rotation angle obtained by referring to the second characteristic torque map should be preferably equal to or larger than 0.5 and equal to or smaller than 0.9, more preferably equal to or larger than 0.6 and equal to or smaller than 0.8 of the pressing force generated by the pressing mechanism 1B in the case where the actual rotation angle of the electric motor 5 is caused to coincide with the rotation angle obtained by referring to the first characteristic torque map.

The relationships among the characteristic torque maps selected in the processes at steps S11 to S15 in the flowchart shown in FIG. 8, the driving force command value and the difference in rotation speed between the front and rear wheels are shown in Table 1 as follows:

TABLE 1

| | | Difference in rotation speed between front and rear wheels | |
| --- | --- | --- | --- |
| | | Smaller than second predetermined value $S_2$ | Equal to or larger than second predetermined value $S_2$ |
| Driving force command value | Smaller than first predetermined value $S_1$ | Same as map used last time | First characteristic torque map |
| | Equal to or larger than first predetermined value $S_1$ | Second characteristic torque map | Same as map used last time |

That is, in the case where the driving force command value is smaller than the first predetermined value $S_1$ and the difference in rotation speed between the front and rear wheels is equal to or larger than the second predetermined value $S_2$, the first characteristic torque map is selected. Further, in the case where the driving force command value is equal to or larger than the first predetermined value $S_1$ and the difference in rotation speed between the front and rear wheels is smaller than the second predetermined value $S_2$, the second characteristic torque map is selected. In the cases other than those described above, the process at Step S16 is executed with the use of the same characteristic torque map (first characteristic torque map or second characteristic torque map) as the map used last time.

In the case where the driving force command value is smaller than the first predetermined value $S_1$ and the difference in rotation speed between the front and rear wheels is equal to or larger than the second predetermined value $S_2$, the intermediate shaft 12 and the inner shaft 13 are rotated relative to each other in the condition in which substantially no driving force is transmitted between the intermediate shaft 12 and the inner shaft 13. If the driving force command value becomes larger thereafter, the multiple disc clutch 8 is brought into the first operating condition in which the multiple disc clutch 8 is pressed with the relative rotation speed between the intermediate shaft 12 and the inner shaft 13 being equal to or higher than a predetermined value (a relative rotation speed between the intermediate shaft 12 and the inner shaft 13 corresponding to the second predetermined value $S_2$).

Further, in the case where the driving force command value is equal to or larger than the first predetermined value $S_1$ and the difference in rotation speed between the front and rear wheels is smaller than the second predetermined value $S_2$, the multiple disc clutch 8 is in the second operating condition in which the multiple disc clutch 8 is pressed with the relative rotation speed between the intermediate shaft 12 and the inner shaft 13 being smaller than the predetermined value (the relative rotation speed between the intermediate shaft 12 and the inner shaft 13 corresponding to the second predetermined value $S_2$).

Thus, by changing the torque target value for the electric motor 5 with respect to the drive command value depending upon whether the multiple disc clutch 8 is in the first operating condition or the second operating condition, a desired driving force in accordance with the driving force command value can be transmitted to the rear wheels 205R, 205L.

Next, a second embodiment of the present invention will be described.

Figure 10:
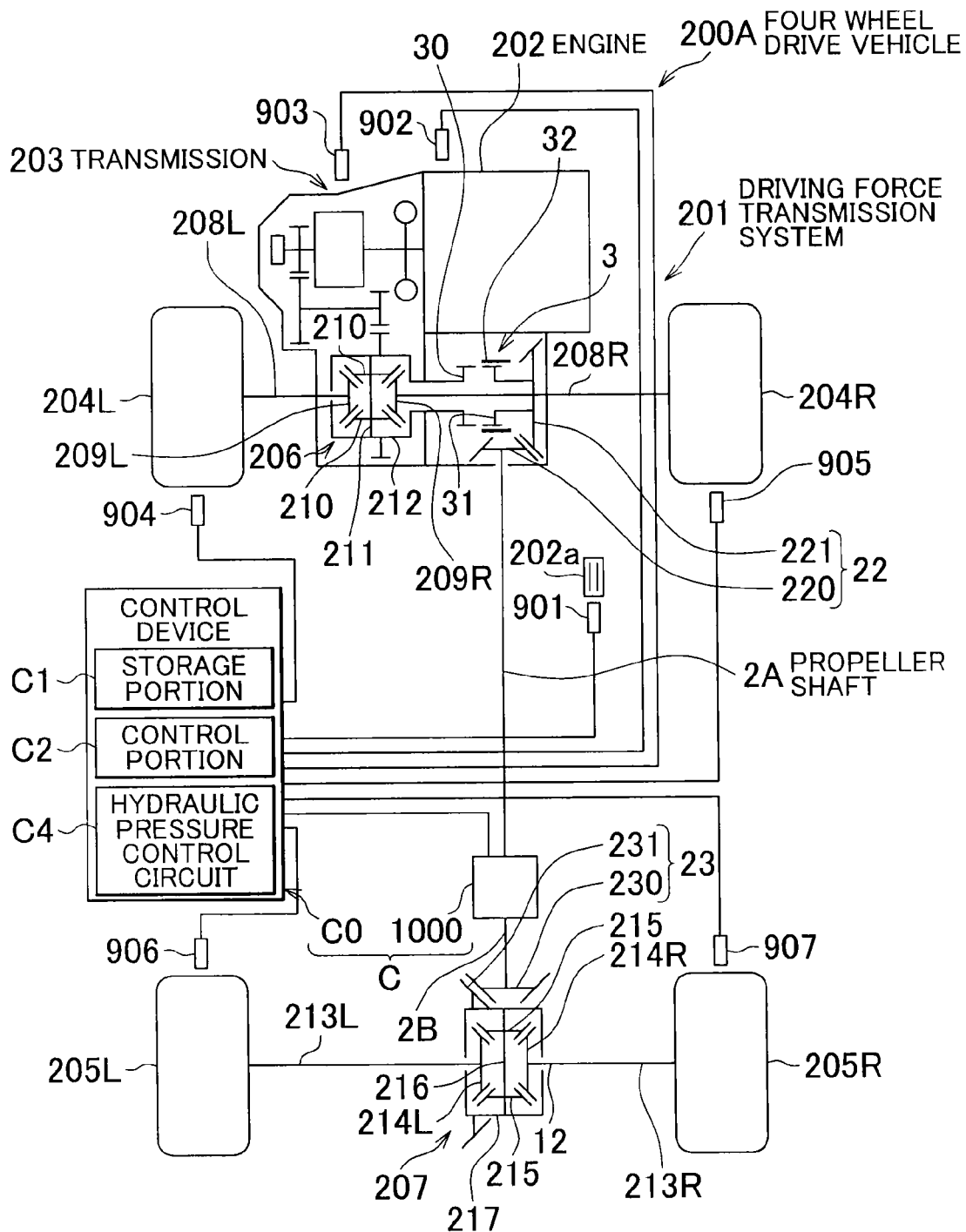
FIG. 10 is a configuration diagram showing a schematic configuration of a four wheel drive vehicle according to a second embodiment.

FIG. 10 is a configuration diagram showing a schematic configuration of a four wheel drive vehicle 200A according to the second embodiment. In FIG. 10, the same reference characters and numerals are assigned to the constituent elements having the functions that are substantially the same as those of the constituent elements described with reference to FIG. 1 in the first embodiment, and the duplicated descriptions thereof will be omitted.

In the first embodiment, the description is provided on the case where the driving force transmission device 1 includes the clutch mechanism 1A having the multiple disc clutch 8 and the pressing mechanism 1B that applies a pressing force to the multiple disc clutch 8, and the pressing mechanism 1B is operated by the torque of the electric motor 5. However, a driving force transmission device 1000 according to the second embodiment is different from the driving force transmission device 1 according to the first embodiment, mainly in that a pressing mechanism 1100 is operated by a hydraulic pressure supplied from a hydraulic pump 1101 that will be described later.

Further, in the four wheel drive vehicle 200 according to the first embodiment, the driving force transmission device 1 is arranged between the rear differential 207 and the right rear wheel 205R. However, in the four wheel drive vehicle 200A according to the second embodiment, the driving force transmission device 1000 is arranged between an end portion of a propeller shaft 2A on the rear wheels 205R, 205L-side and a pinion gear 2B that is meshed with the ring gear 231 of the rear differential 207.

The four wheel drive vehicle 200A and the driving force transmission device 1000 according to the second embodiment will be hereinafter described in detail.

As shown in FIG. 10, in the four wheel drive vehicle 200A, the drive pinion 220 is provided at one end portion of the propeller shaft 2A on the engine 202-side, and the other end portion of the propeller shaft 2A is coupled to a flange 1400 (will be described later) in the driving force transmission device 1000. Further, one end portion of the pinion gear 2B is coupled to an inner shaft 1220 (will be described later) in the driving force transmission device 1000, and the drive pinion 230 is provided at the other end portion of the pinion gear 2B. This drive pinion 230 is meshed with the ring gear 231 of the rear differential 207. The drive pinion 230 and the ring gear 231 constitute the gear mechanism 23 on the rear wheel side. The side gear 214R of the rear differential 207 is coupled to the axle shaft 213R on the rear wheel side so that the side gear 214R is not rotatable relative to the axle shaft 213R.

Further, a control device C0 according to the second embodiment includes a hydraulic pressure control circuit C4, instead of the motor control circuit C3 according to the first embodiment. The content of the control executed by the control device C0 including the hydraulic pressure control circuit C4 will be described later.

Figure 11:
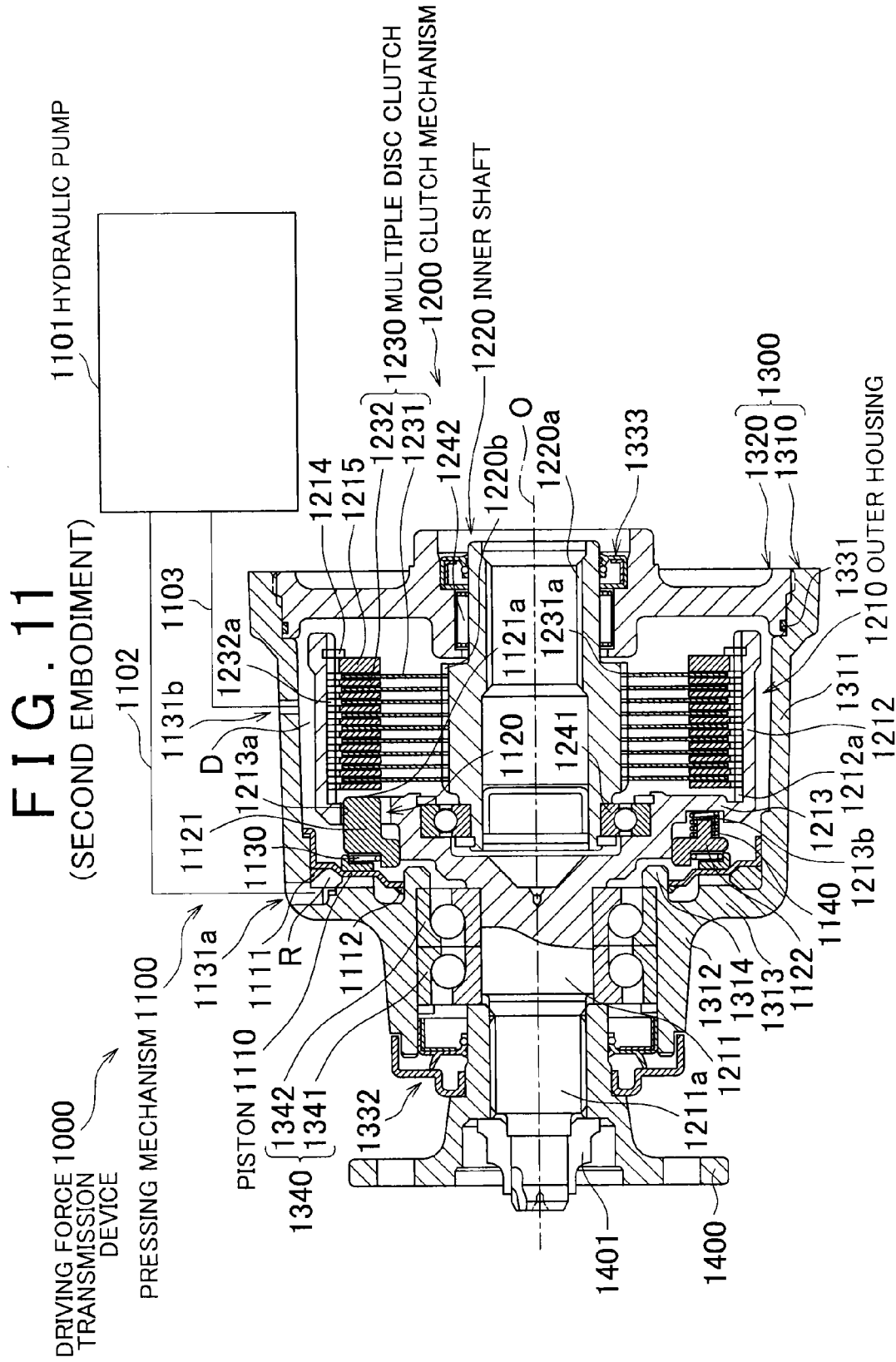
FIG. 11 is a sectional view showing an example of a configuration of a driving force transmission device according to the second embodiment.

FIG. 11 is a sectional view showing an example of a configuration of the driving force transmission device 1000. The driving force transmission device 1000 includes the pressing mechanism 1100 and a clutch mechanism 1200. The pressing mechanism 1100 includes the hydraulic pump 1101 that is controlled by the control device C0. The clutch mechanism 1200 includes an outer housing 1210, the inner shaft 1220, and a multiple disc clutch 1230 arranged between the outer housing 1210 and the inner shaft 1220. The outer housing 1210 is an outer rotary member. The inner shaft 1220 is an inner rotary member.

The outer housing 1210 has a columnar shaft portion 1211, a tubular portion 1212 and a connecting portion 1213, which are provided integrally with each other. The connecting portion 1213 connects the shaft portion 1211 with the tubular portion 1212. The inner diameter of the tubular portion 1212 is larger than the outer diameter of the shaft portion 1211. The connecting portion 1213 is formed so as to project radially outward from one end portion of the shaft portion 1211 to a large extent. A through-hole 1213a and a recess 1213b are formed in the connecting portion 1213. The through-hole 1213a axially extends through the connecting portion 1213. The recess 1213b is opened toward the shaft portion 1211. Further, a plurality of inner peripheral spline teeth 1212a extending in a direction parallel with the rotation axis O is formed in an inner peripheral surface of the tubular portion 1212.

The inner shaft 1220 has a hollow tubular shape. A spline engagement portion 1220a, with which one end portion of the pinion gear 2B is engaged, is formed in a center portion of the inner shaft 1220. A plurality of outer peripheral spline teeth 1220b extending in a direction in parallel with the rotation axis O is formed in a portion of an outer peripheral surface of the inner shaft 1220. The inner shaft 1220 is supported by a ball bearing 1241 and a needle roller bearing 1242 so as to be coaxially rotatable relative to the outer housing 1210.

In the multiple disc clutch 1230, a plurality of inner clutch plates 1231 is frictionally engaged with, and disengaged from a plurality of outer clutch plate 1232, and thus, the multiple disc clutch 1230 couples the outer housing 1210 with the inner shaft 1220 so that a driving force can be transmitted between the outer housing 1210 and the inner shaft 1220. The inner clutch plates 1231 and the outer clutch plates 1232 are alternately arranged along the rotation axis O.

Each of the inner clutch plates 1231 has a straight spline engagement portion 1231a formed in its inner peripheral portion. The straight spline engagement portions 1231a of the inner clutch plates 1231 are engaged with the outer peripheral spline teeth 1220b formed in the outer peripheral surface of the inner shaft 1220 so that the inner clutch plates 1231 are not rotatable relative to the inner shaft 1220, and are axially movable.

Each of the outer clutch plates 1232 has a straight spline engagement portion 1232a formed in its outer peripheral portion. The straight spline engagement portions 1232a of the outer clutch plates 1232 are engaged with the inner peripheral straight spline teeth 1212a formed in the inner peripheral surface of the tubular portion 1212 of the outer housing 1210 so that the outer clutch plates 1232 are not rotatable relative to the outer housing 1210 and are axially movable.

The movement of the inner clutch plates 1231 and the outer clutch plates 1232 toward the opening side of the tubular portion 1212 of the outer housing 1210 is restricted by a snap ring 1214 that is engaged with an inner periphery of the tubular portion 1212 of the outer housing 1210 at a position in the vicinity of the opening portion of the tubular portion 1212 (end portion on the side opposite to the connecting portion 1213-side) and an annular restricting member 1215 interposed between the snap ring 1214 and the multiple disc clutch 1230.

The tubular portion 1212 and the connecting portion 1213 of the outer housing 1210 and the inner clutch plates 1231 are accommodated in a device casing 1300. The device casing 1300 is constituted by a casing body 1310 and a casing cover 1320. The casing body 1310 is opened toward one side in the direction of the rotation axis O (toward the rear differential 207-side). The casing cover 1320 closes the opening of the casing body 1310. The casing cover 1320 is secured to the casing body 1310 by for example, press-fitting so that the casing cover 1320 is not rotatable relative to the casing body 1310, and is not axially movable, and an O-ring 1331 is arranged between the casing body 1310 and the casing cover 1320.

The casing body 1310 has a large diameter tubular portion 1311, a small diameter tubular portion 1312, a wall portion 1313, and an annular projection 1314, which are provided integrally with each other. The wall portion 1313 connects the large diameter tubular portion 1311 with the small diameter tubular portion 1312. The annular projection 1314 projects, in parallel with the rotation axis O, from an inner end portion of the wall portion 1313 toward the connecting portion 1213 of the outer housing 1210. An inner peripheral surface of the large diameter tubular portion 1311 is opposed to an outer peripheral surface of the tubular portion 1212 of the outer housing 1210. The shaft portion 1211 of the outer housing 1210 projects outward from one end portion of the small diameter tubular portion 1312.

The flange 1400 is spline-engaged with a distal end portion 1211a of the shaft portion 1211 projecting from the small diameter tubular portion 1312 of the casing body 1310 so that the flange 1400 is not rotatable relative to the shaft portion 1211. One end portion of the propeller shaft 2A is coupled to this flange 1400 so that the propeller shaft 2A is not rotatable relative to the flange 1400. The flange 1400 is secured to the shaft portion 1211 of the outer housing 1210 by a nut 1401 so as to be prevented from coming off the shaft portion 1211.

A seal mechanism 1332 and a bearing mechanism 1340 constituted by a pair of ball bearings 1341, 1342 are interposed between the small diameter tubular portion 1312 of the casing body 1310 and the shaft portion 1211 of the outer housing 1210. Further, a seal mechanism 1333 is interposed between the casing cover 1320 and the inner shaft 1220.

A piston 1110, a pressing member 1120 and a thrust needle roller bearing 1130 that constitute the pressing mechanism 1100 is accommodated in the device casing 1300. The piston 1110 is formed to have an annular shape, and an outer peripheral portion of the piston 1110 is brought into slidable contact with an inner peripheral surface of the large diameter tubular portion 1311 of the casing body 1310 and with the outer peripheral surface of the tubular portion 1212 of the outer housing 1210. Further, an inner peripheral portion of the piston 1110 is brought into slidable contact with an outer peripheral surface of the annular projection 1314 of the casing body 1310. An outer peripheral seal member 1111 is provided at the outer peripheral portion of the piston 1110, and an inner peripheral seal member 1112 is provided at the inner peripheral portion of the piston 1110.

A thrust needle roller bearing 1130 is interposed between the piston 1110 and the pressing member 1120 so as to allow the piston 1110 and the pressing member 1120 to rotate relative to each other.

A protrusion 1121 and a receiving portion 1122 are formed in the pressing member 1120. The protrusion 1121 extends through the through-hole 1213a formed in the connecting portion 1213 of the outer housing 1210. The receiving portion 1122 receives an elastic force of a coil spring 1140 as an elastic member whose one end portion is accommodated in the recess 1213b. The pressing member 1120 is urged by the coil spring 1140 toward the wall portion 1313 of the casing body 1310.

The pressing member 1120 is axially moved together with the piston 1110 that is moved by a hydraulic pressure from the hydraulic pump 1101. The protrusion 1121 of the pressing member 1120 is opposed to the multiple disc clutch 1230. In the example shown in FIG. 11, the distal end face 1121a of the protrusion 1121 is opposed to the outer clutch plate 1232 that is arranged on the innermost side (the connecting portion 1213-side) of the tubular portion 1212 of the outer housing 1210.

A hydraulic oil chamber R is formed between the piston 1110 and the wall portion 1313 of the casing body 1310. Within an inner space of the device casing 1300, a space other than the hydraulic oil chamber R is formed as a drain chamber D. A first communication passage 1131a and a second communication passage 1131b are formed in the large diameter tubular portion 1311 of the casing body 1310. The first communication passage 1131a communicates with the hydraulic oil chamber R. The second communication passage 1131b communicates with the drain chamber D. One end of a hydraulic oil pipe 1102 is connected to the first communication passage 1131a. One end of a drain pipe 1103 is connected to the second communication passage 1131b. The other end of the hydraulic oil pipe 1102 and the other end of the drain pipe 1103 are connected to the hydraulic pump 1101.

The hydraulic pump 1101 increases the pressure of the hydraulic oil, which has been sucked up from the drain pipe 1103, to a high pressure, by pumping action, and supplies the high-pressure hydraulic oil into the hydraulic oil chamber R through the hydraulic oil pipe 1102. Accordingly, the piston 1110 receives the hydraulic pressure from the hydraulic oil chamber R, moves away from the wall portion 1313, and presses the multiple disc clutch 1230 through the protrusion 1121 of the pressing member 1120. Since the multiple disc clutch 1230 is pressed, the outer housing 1210 and the inner shaft 1220 are coupled to each other so that a torque can be transmitted between the outer housing 1210 and the inner shaft 1220, and thus, the driving force of the engine 202 is transmitted from the propeller shaft 2A to the pinion gear 2B through the driving force transmission device 1000.

The hydraulic pressure of the hydraulic oil that is supplied into the hydraulic chamber R from the hydraulic pump 1101 through the hydraulic oil pipe 1102 can be controlled by the control device C0. The torque that is transmitted between the outer housing 1210 and the inner shaft 1220 by the multiple disc clutch 1230 is changed, depending upon a pressing force applied to the multiple disc clutch 1230 by the pressing mechanism 1100, that is, a force that is applied to the multiple disc clutch 1230 by the piston 1110 actuated by the hydraulic pressure in the hydraulic oil chamber R through the pressing member 1120 and that presses the multiple disc clutch 1230. Thus, the control device C0 can control the driving force transmitted to the rear wheels 205R, 205L-side through the driving force transmission device 1000.

Figure 12:
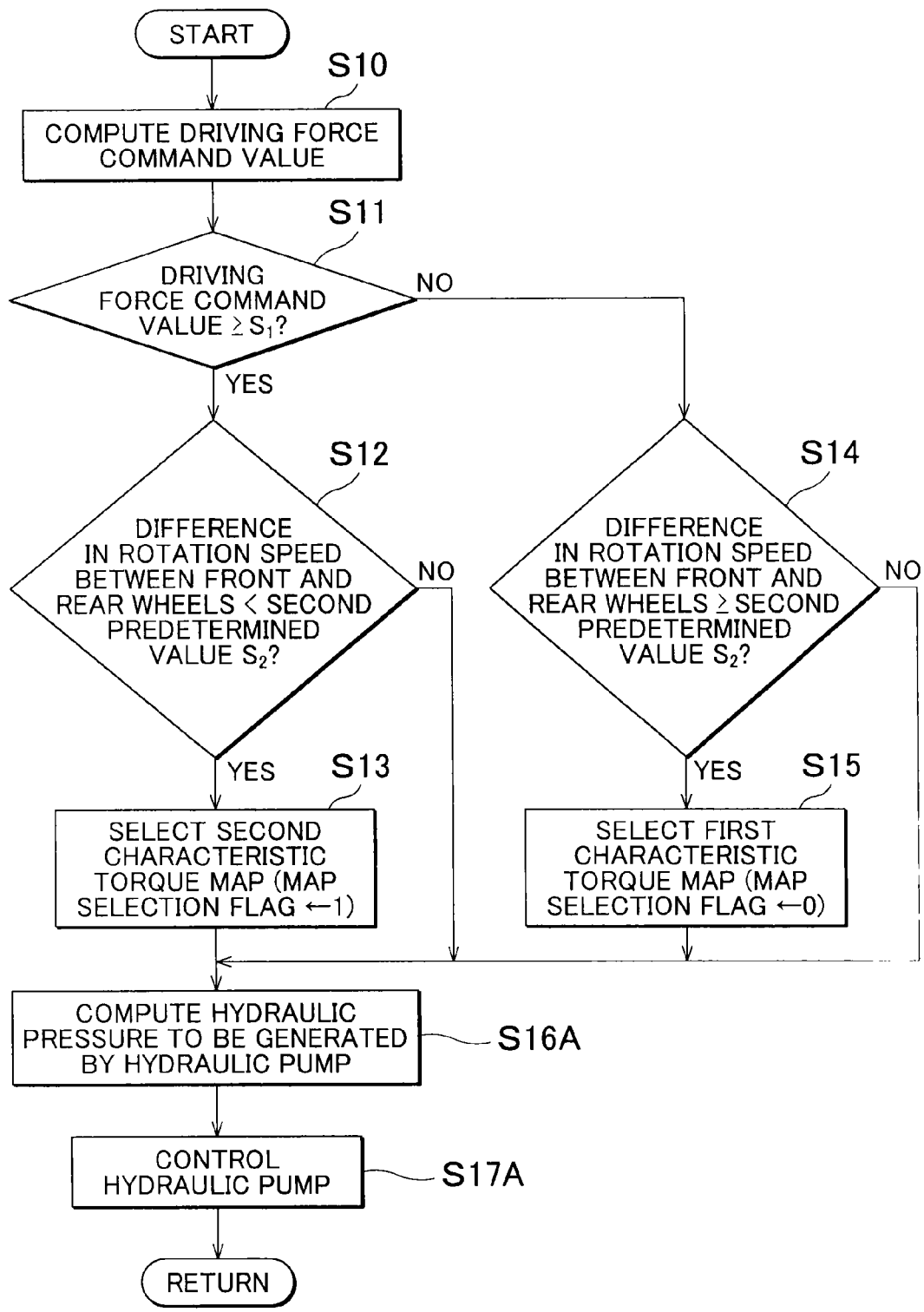
FIG. 12 is a flowchart showing a specific example of processing executed by the control portion in a control device according to the second embodiment.

FIG. 12 is a flowchart showing a specific example of processing executed by the control portion C2 in the control device C0 according this embodiment. The control portion C2 executes the processing shown in this flowchart, repeatedly at predetermined control intervals (for example, at control intervals of 100 ms). In the flowchart shown in FIG. 12, the processes at Steps S10 to S15 are the same as those described with reference to FIG. 8 in the first embodiment, and accordingly, the duplicated descriptions of these processes will be omitted.

The control portion C2 according to the second embodiment computes a hydraulic pressure to be generated by the hydraulic pump 1101 at Step S16A. This computation is executed by referring to the first characteristic torque map or the second characteristic torque map stored in the storage portion C1. The configurations of the first characteristic torque map and the second characteristic torque map (configurations shown by the graph in which the driving force command value is indicated by the abscissa while the control target value is indicated by the ordinate) are the same as those described with reference to FIG. 9 in the first embodiment, except that a hydraulic pressure to be generated by the hydraulic pump 1101 is defined as the control target value.

The control portion C2 computes the hydraulic pressure to be generated by the hydraulic pump 1101 with the use of the first characteristic torque map if the map selection flag is set to "0", and computes the hydraulic pressure to be generated by the hydraulic pump 1101 with the use of the second characteristic torque map if the map selection flag is set to "1". The hydraulic pressure to be generated by the hydraulic pump 1101, which is computed with the use of the second characteristic torque map, is preferably 50 to 90%, and more preferably 60 to 80% of the hydraulic pressure to be generated by the hydraulic pump 1101, which is computed with the use of the first characteristic torque map.

Next, the control portion C2 outputs a control signal to the hydraulic pressure control circuit C4, on the basis of the hydraulic pressure to be generated by the hydraulic pump 1101, which is computed at Step S16A, and controls the hydraulic pump 1101 so that the hydraulic oil having the hydraulic pressure computed at Step S16A is discharged from the hydraulic pump 1101.

According to the second embodiment described above as well, the same operation and advantageous effects as those described in the first embodiment can be achieved.

Next, a third embodiment of the present invention will be explained. A driving force transmission device 1000A according to the third embodiment is different from the driving force transmission device 1000 according to the second embodiment, mainly in that the driving force transmission device 1000A according to the third embodiment has the configuration in which a pressure control valve 1105 is provided in the driving force transmission device 1000 according to the second embodiment. The position at which the driving force transmission device 1000A is arranged in the four wheel drive vehicle 200A is the same as the position at which the driving force transmission device 1000 according to the second embodiment is arranged in the four wheel drive vehicle 200A (refer to FIG. 10). Further, the hydraulic control circuit C4 in the control device C0 according to this embodiment is configured to control a control hydraulic pressure of the pressure control valve 1105. The configuration of the driving force transmission device 1000A and a control executed by the control device C0 will be described in detail with reference to FIG. 13 and FIG. 14.

Figure 13:
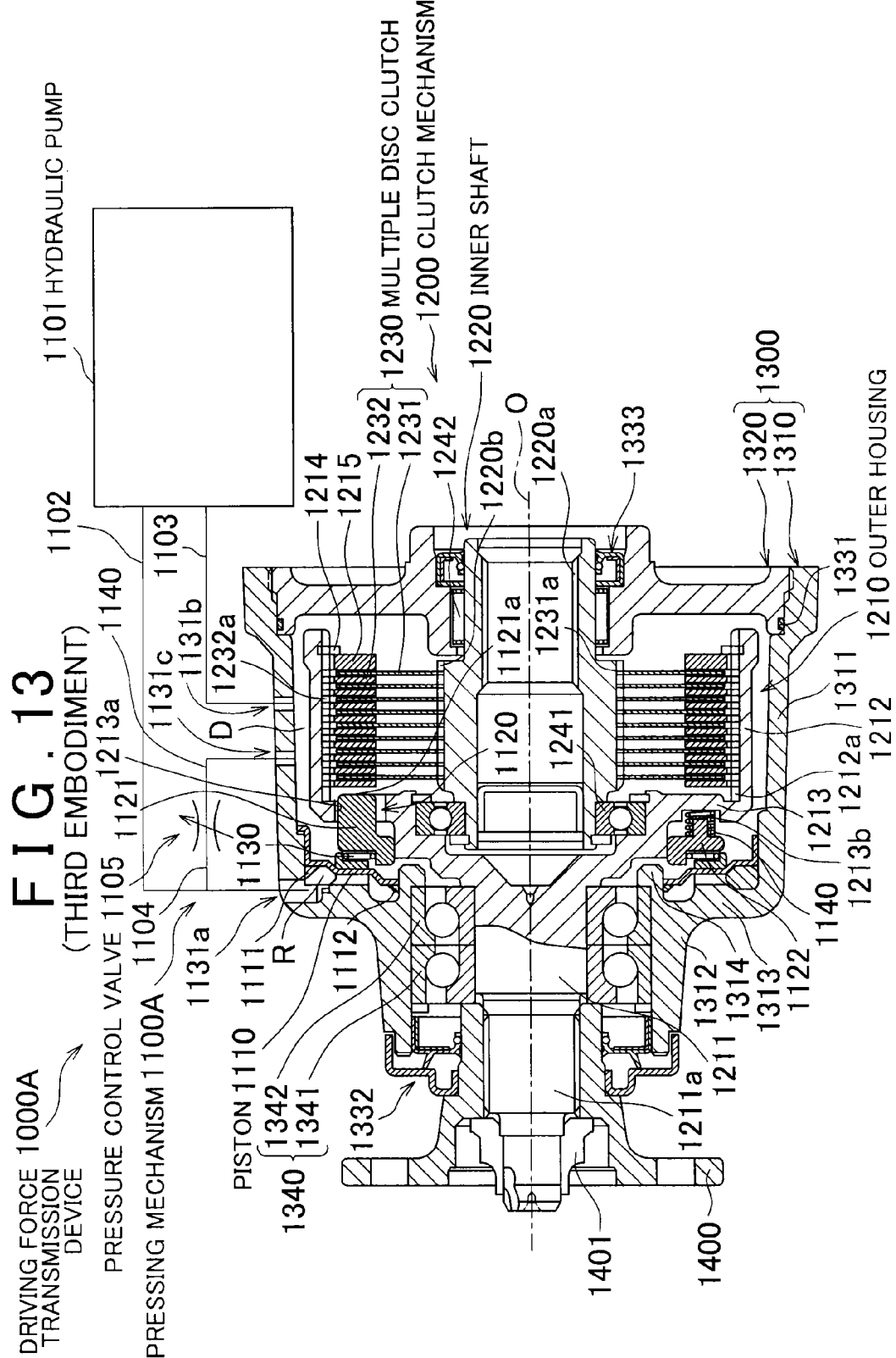
FIG. 13 is a sectional view showing an example of a configuration of a driving force transmission device according to a third embodiment.

FIG. 13 is a sectional view showing an example of a configuration of the driving force transmission device 1000A according to the third embodiment. In FIG. 13, the same characters and numerals are assigned to the constituent elements having functions that are substantially the same as those of the constituent elements described with reference to FIG. 11 in the second embodiment, and the duplicated descriptions thereof will be omitted.

A third communication passage 1131c is formed in the large diameter tubular portion 1311 of the casing body 1310 according to the third embodiment, in addition to the first communication passage 1131a and the second communication passage 1131b. A low pressure pipe 1104 that communicates with a low pressure port of the pressure control valve 1105 is connected to the third communication passage 1131c. The pressure control valve 1105 is arranged between the hydraulic oil pipe 1102 and the low pressure pipe 1104. When the hydraulic pressure in the hydraulic oil pipe 1102 becomes equal to or higher than a predetermined value, the pressure control valve 1105 causes the hydraulic oil in the hydraulic oil pipe 1102 to flow into the drain chamber D through the low pressure pipe 1104, so as to control the hydraulic pressure in the hydraulic pressure chamber R to the above-described predetermined value. The control hydraulic pressure (the above-described predetermined value of the hydraulic pressure) of the pressure control valve 1105 can be controlled by the control device C0.

Figure 14:
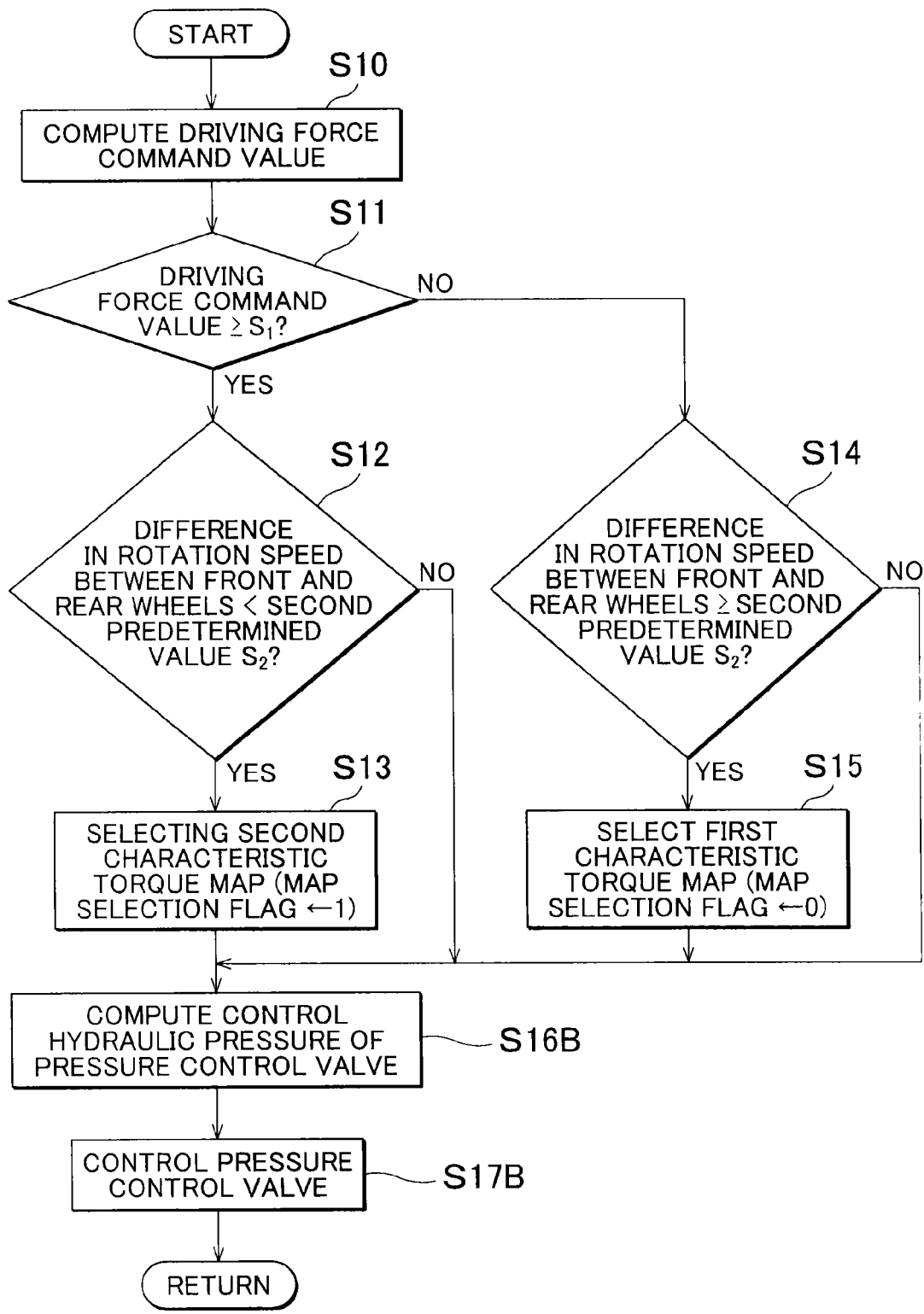
FIG. 14 is a flowchart showing a specific example of processing executed by the control portion in the control device according to the third embodiment.

FIG. 14 is a flowchart showing a specific example of processing executed by the control portion C2 of the control device C0 according to the third embodiment. The control portion C2 executes the processing shown in this flowchart, repeatedly at predetermined control intervals (for example, at control intervals of 100 ms). In the flowchart shown in FIG. 14, the processes at Step S10 to S15 are the same as those described with references to FIG. 8 and FIG. 12 in the first and second embodiments, and accordingly the duplicated descriptions of these processes will be omitted.

The control portion C2 according to this embodiment computes the control hydraulic pressure of the pressure control valve 1105 at Step S16B. This computation is executed by referring to the first characteristic torque map or the second characteristic torque map stored in the storage portion C1. The configurations of the first characteristic torque map and the second characteristic torque map are the same as those described with reference to FIG. 9 in the first embodiment, except that the control hydraulic pressure (target value) of the pressure control valve 1105 is defined as the control target value.

The control portion C2 computes the target value of the control hydraulic pressure of the pressure control valve 1105 with the use of the first characteristic torque map if the map selection flag is set to "0", and computes the target value of the control hydraulic pressure of the pressure control valve 1105 with the use of second characteristic torque map if the map selection flag is set to "1". The target value of the control hydraulic pressure of the pressure control valve 1105, which is computed with the use of the second characteristic torque map, is preferably 50 to 90%, more preferably 60 to 80% of the target value of the control hydraulic pressure of the pressure control valve 1105, which is computed with the use of the first characteristic torque map.

Next, the control portion C2 outputs a control signal to the pressure control circuit C4 on the basis of the target value of the control hydraulic pressure of the pressure control valve 1105, which is computed at Step S16B, and thus, the control portion C2 controls the pressure control valve 1105 so that an actual control hydraulic pressure of the pressure control valve 1105 coincides with the target value of the control hydraulic pressure of the pressure control valve 1105, which is computed at Step S16B.

According to the third embodiment as described above as well, the same operation and advantageous effects as those described in the first and second embodiments can be achieved.

The driving force transmission device and the four wheel drive vehicle using this driving force transmission device according to the embodiments have been described. However, the present invention should not be limited to the above-described embodiments. The present invention may be implemented in various forms without departing from the scope of the present invention.

In the above-described embodiments, the case where the present invention is applied to the four wheel drive vehicle 200 in which the front wheels 204R, 204L are main drive wheels while the rear wheels 205R, 205L are auxiliary drive wheels has been described. However, the present invention is not limited to the embodiments. The present invention may be applied to a four wheel drive vehicle in which the front wheels are auxiliary drive wheels while the rear wheels are main drive wheels.

The configuration of the pressing mechanism 1B is not limited to the configuration exemplified in, for example, FIG. 2. The pressing mechanism 1B may have various configurations, as long as the pressing mechanism 1B can press the multiple disc clutch 8 even in the condition in which there is not relative rotation between the intermediate shaft 12 and the inner shaft 13. For example, as the mechanism for converting the torque of the electric motor 5 to the pressing force for pressing the multiple disc clutch 8, a ball spline mechanism, in which a plurality of balls rolls in ball screw grooves helically formed in an outer peripheral surface of a direct drive shaft so as to convert rotating motion into linear motion, may be used, instead of the cam mechanism 16.

Further, in the above-described embodiments, the torque target value is set by selectively referring to one of the first characteristic torque map and the second characteristic torque map. However, the present invention is not limited to the embodiments. For example, by using a correction coefficient that is set according to results of determinations at Steps S11, S12, S14 shown in FIG. 8, the torque target value may be set to be larger in the first operating condition than in the second operating condition.

Further, in the above-described second and third embodiments, the case where the driving force transmission device 1000 or 1000A is arranged between the propeller shaft 2A and the pinion gear 2B has been described. However, the present invention is not limited to this configuration. For example, as shown in FIG. 1, the driving force transmission device 1000 or 1000A may be arranged between the rear differential 207 and the right rear wheel 205R. Further, the power transmission device 1 according to the first embodiment may be arranged between the propeller shaft 2A and the pinion gear 2B.

According to the present invention, it is possible to enhance the accuracy of the driving force transmitted through the multiple disc clutch.

What is claimed is:

1. A driving force transmission control apparatus comprising:
an outer rotary member having an inner peripheral surface in which a plurality of inner peripheral spline teeth is formed, the inner peripheral spline teeth extending in a direction of a rotation axis;
an inner rotary member supported inside the outer rotary member so as to be coaxially rotatable relative to the outer rotary member, and having an outer peripheral surface in which a plurality of outer peripheral spline teeth is formed, the outer peripheral spline teeth extending in the direction of the rotation axis;
a multiple disc clutch including a plurality of outer clutch plates engaged with the inner peripheral spline teeth so as to be axially movable, and a plurality of inner clutch plates engaged with the outer peripheral spline teeth so as to be axially movable, the outer clutch plates and the inner clutch plates being alternately arranged in the direction of the rotation axis;
a pressing mechanism that presses the multiple disc clutch in the direction of the rotation axis; and
a control portion that controls the pressing mechanism, wherein the control portion makes a determination as to whether the multiple disc clutch is in a first operating condition in which the multiple disc clutch is pressed with a relative rotation speed between the outer rotary member and the inner rotary member being equal to or higher than a predetermined value, or in a second operating condition in which the multiple disc clutch is pressed with the relative rotation speed being lower than the predetermined value, and the control portion controls the pressing mechanism based on a result of the determination.

2. The driving force transmission control apparatus according to claim 1, wherein in a case where the result of the determination indicates the first operating condition, the control portion increases a pressing force for pressing the multiple disc clutch applied by the pressing mechanism, as compared to a case where the result of the determination indicates the second operating condition.

3. The driving force transmission control apparatus according to claim 1, wherein the control portion controls the pressing mechanism by selectively referring to a first characteristic torque map and a second characteristic torque map according to whether the multiple disc clutch is in the first operating condition or the second operating condition, each of the first characteristic torque map and the second characteristic torque map defining a relationship between a command value of a driving force to be transmitted between the outer rotary member and the inner rotary member, and a control target value relating to a pressing force to be generated by the pressing mechanism,
in the second characteristic torque map referred to by the control portion in a case where the multiple disc clutch is in the second operating condition, the control target value is set so that the pressing force is smaller than the pressing force in the first characteristic torque map referred to by the control portion in a case where the multiple disc clutch is in the first operating condition.

4. The driving force transmission control apparatus according to claim 2, wherein the control portion controls the pressing mechanism by selectively referring to a first characteristic torque map and a second characteristic torque map according to whether the multiple disc clutch is in the first operating condition or the second operating condition, each of the first characteristic torque map and the second characteristic torque map defining a relationship between a command value of a driving force to be transmitted between the outer rotary member and the inner rotary member, and a control target value relating to a pressing force to be generated by the pressing mechanism, in the second characteristic torque map referred to by the control portion in a case where the multiple disc clutch is in the second operating condition, the control target value is set so that the pressing force is smaller than the pressing force in the first characteristic torque map referred to by the control portion in a case where the multiple disc clutch is in the first operating condition.

5. The driving force transmission control apparatus according to claim 3, wherein the pressing mechanism includes an electric motor, and a conversion mechanism that converts a torque of the electric motor to a pressing force for pressing the multiple disc clutch.

6. The driving force transmission control apparatus according to claim 4, wherein the pressing mechanism includes an electric motor, and a conversion mechanism that converts a torque of the electric motor to a pressing force for pressing the multiple disc clutch.

7. The driving force transmission control apparatus according to claim 5, wherein in each of the first characteristic torque map and the second characteristic torque map, a torque to be generated by the electric motor is defined as the control target value.

8. The driving force transmission control apparatus according to claim 6, wherein in each of the first characteristic torque map and the second characteristic torque map, a torque to be generated by the electric motor is defined as the control target value.

9. The driving force transmission control apparatus according to claim 5, wherein in each of the first characteristic torque map and the second characteristic torque map, a rotation angle of the electric motor is defined as the control target value.

10. The driving force transmission control apparatus according to claim 6, wherein in each of the first characteristic torque map and the second characteristic torque map, a rotation angle of the electric motor is defined as the control target value.

11. The driving force transmission control apparatus according to claim 3, wherein the pressing mechanism includes a piston that presses the multiple disc clutch, and a hydraulic pump that supplies hydraulic oil into a hydraulic oil chamber for the piston.

12. The driving force transmission control apparatus according to claim 4, wherein the pressing mechanism includes a piston that presses the multiple disc clutch, and a hydraulic pump that supplies hydraulic oil into a hydraulic oil chamber for the piston.

13. The driving force transmission control apparatus according to claim 11, wherein in each of the first characteristic torque map and the second characteristic torque map, a hydraulic pressure to be generated by the hydraulic pump is defined as the control target value.

14. The driving force transmission control apparatus according to claim 12, wherein in each of the first characteristic torque map and the second characteristic torque map, a hydraulic pressure to be generated by the hydraulic pump is defined as the control target value.

15. The driving force transmission control apparatus according to claim 11, wherein the pressing mechanism further includes a pressure control valve that controls a pressure in the hydraulic oil chamber.

16. The driving force transmission control apparatus according to claim 12, wherein the pressing mechanism further includes a pressure control valve that controls a pressure in the hydraulic oil chamber.

17. The driving force transmission control apparatus according to claim 15, wherein in each of the first characteristic torque map and the second characteristic torque map, a control hydraulic pressure of the pressure control valve is defined as the control target value.

18. The driving force transmission control apparatus according to claim 16, wherein in each of the first characteristic torque map and the second characteristic torque map, a control hydraulic pressure of the pressure control valve is defined as the control target value.

* * * * *